US010557954B2

(12) United States Patent
Tonellot et al.

(10) Patent No.: US 10,557,954 B2
(45) Date of Patent: Feb. 11, 2020

(54) MODELING ANGLE DOMAIN COMMON IMAGE GATHERS FROM REVERSE TIME MIGRATION

(71) Applicant: Saudi Arabian Oil Company, Dhahran (SA)

(72) Inventors: Thierry-Laurent Dominique Tonellot, Assas (FR); Vincent Etienne, Abqaiq (SA)

(73) Assignee: Saudi Arabian Oil Company, Dhahran (SA)

( * ) Notice: Subject to any disclaimer, the term of this patent is extended or adjusted under 35 U.S.C. 154(b) by 269 days.

(21) Appl. No.: 15/620,424

(22) Filed: Jun. 12, 2017

(65) Prior Publication Data
US 2018/0356547 A1 Dec. 13, 2018

(51) Int. Cl.
*G01V 1/28* (2006.01)
*G01V 1/36* (2006.01)
*G01V 1/30* (2006.01)

(52) U.S. Cl.
CPC ............ *G01V 1/282* (2013.01); *G01V 1/303* (2013.01); *G01V 1/36* (2013.01); *G01V 2210/51* (2013.01); *G01V 2210/679* (2013.01)

(58) Field of Classification Search
CPC .......... G01V 1/282; G01V 1/303; G01V 1/36; G01V 2210/51; G01V 2210/679
See application file for complete search history.

(56) References Cited

U.S. PATENT DOCUMENTS 9,128,205 B2 9/2015 Guan et al.
9,250,341 B2 2/2016 Tang et al.
(Continued)

FOREIGN PATENT DOCUMENTS

WO WO2012160409 A1 11/2012
WO WO2013134524 A2 9/2013

OTHER PUBLICATIONS

Jiangtao, Hu; Huazhong, Wang; Xiongwen Wang; Angle gathers from reverse time migration using analytic wavefield propagation and decomposition in the time domain; Jan.-Feb. 2016; Geophysics, vol. 1 S1 No. 1; ppg. S1-S9 (Year: 2016).*

(Continued)

*Primary Examiner* — Sujoy K Kundu
*Assistant Examiner* — Terence E Stifter, Jr.
(74) *Attorney, Agent, or Firm* — Fish & Richardson P.C.

(57) ABSTRACT

The present disclosure describes methods and systems, including computer-implemented methods, computer program products, and computer systems, for modeling angle domain common image gathers (ADCIG) from reverse time migration (RTM). One computer-implemented method includes calculating seismic source and receiver wavefields based on seismic data, calculating characteristic source and receiver wavefields from the seismic source and receiver wavefields, calculating propagation angles for the characteristic source and receiver wavefields, applying a wavefield decomposition algorithm on the characteristic source and receiver wavefields to obtain corresponding directional source and receiver wavefields, the wavefield decomposition algorithm decomposing wavefield amplitude of a wavefield in an angle interval centered on a propagation angle of the wavefield, and forming ADCIG by applying an image condition to the obtained directional source and receiver wavefields.

20 Claims, 16 Drawing Sheets
(4 of 16 Drawing Sheet(s) Filed in Color)

(56) References Cited

U.S. PATENT DOCUMENTS

| | | | | |
|---|---|---|---|---|
| 2012/0075954 | A1* | 3/2012 | Xu | G01V 1/303 |
| | | | | 367/38 |
| 2014/0149046 | A1* | 5/2014 | Baina | G01V 1/282 |
| | | | | 702/14 |
| 2015/0063066 | A1* | 3/2015 | Burnett | G01V 1/30 |
| | | | | 367/38 |
| 2015/0235081 | A1* | 8/2015 | Jiang | G06K 9/00476 |
| | | | | 382/109 |

OTHER PUBLICATIONS

Metivier et al., "A robust absorbing layer method for anisotropic seismic wave modeling," Journal of Computational Physics, vol. 279, Dec. 15, 2014, 23 pages.

Hu et al., "Angle gathers from reverse time migration using analytic wave field propagation and decomposition in the time domain," Geophysics, vol. 81, No. 1, Jan. 1, 2016, 9 pages.

Tang et al., "3D angle gathers with plane-wave reverse-time migration," Geophysics, Society of Exploration Geophysicists, vol. 78, No. 2, Mar. 1, 2013, 7 pages.

International Search Report issued in International Application No. PCT/US2018/036815 dated Oct. 10, 2018, 14 pages.

Beydoun et al., "B044 Why Migrate before AVO? A Simple Example," EAEG—55th Meeting and Technical Exhibition, Jun. 7-11, 1993, 2 pages.

Biondi et al., "Angle-Domain Common-Image Gathers for Migration Velocity Analysis by Wavefield-Continuation Imaging," Geophysics, vol. 69, No. 5, Sep.-Oct. 2004, pp. 1283-1298.

Biondi et al., "Tomographic Full Waveform Inversion (TFWI) by Combining Full Waveform Inversion with Wave-Equation Migration Velocity Analysis," published in 2012, 6 pages.

Chauris et al., "Migration Velocity Analysis from Locally Coherent Events in 2-D Laterally Heterogeneous Media, Part I: Theoretical Aspects," Geophysics, vol. 67, No. 4, Jul.-Aug. 2002, pp. 1202-1212.

Dickens et al., "RTM Angle Gathers Using Poynting Vectors," published in 2011, 5 pages.

Fei et al., "Removing False Images in Reverse Time Migration: The Concept of De-Primary," Geophysics, vol. 80, No. 6, Nov.-Dec. 2015, pp. S237-S244.

Jin et al., "Background Velocity Inversion with a Genetic Algorithm," Geophysical Research Letters, vol. 20, No. 2, Jan. 22, 1993, pp. 93-96.

Jin et al., "Comparison of Methods for Extracting ADCIGs from RTM," Geophysics, vol. 79, No. 3, May-Jun. 2014, pp. S89-S103.

Jones, "Tutorial: Migration Imaging Conditions," Technical Article, First Break, vol. 32, Dec. 2014, 11 pages.

Lameloise et al., "Improving the Gradient of the Image-Domain Objective Function using Quantitative Migration for a More Robust Migration Velocity Analysis," Geophysical Prospecting, published in 2015, pp. 391-404.

Liu et al., "Imaging Diffractors using Wave-Equation Migration," Geophysics, vol. 81, No. 6, Nov.-Dec. 2016, pp. S459-S468.

Liu et al., "Migration Velocity Analysis: Theory and an Iterative Algorithm," Geophysics, vol. 60, No. 1, Jan.-Feb. 1995, pp. 142-153.

Modave et al., "Nodal Discontinuous Galerkin Simulations for Reverse-Time Migration on GPU Clusters," Jun. 17, 2015, 28 pages.

Patrikeeva et al., "Comparison of Angle Decomposition Methods for Wave-Equation Migration," published in 2013, pp. 3773-3778.

Reshef et al., "Post-Stack Velocity Analysis in the Dip-Angle Domain using Diffractions," Geophysical Prospecting, published in 2009, vol. 57, pp. 811-821.

Ruger et al., "Using AVO for Fracture Detection: Analytic Basis and Practical Solutions," The Leading Edge, Oct. 1997, pp. 1429-1434.

Sava et al., "Overview and Classification of Wavefield Seismic Imaging Methods," The Leading Edge, Feb. 2009, pp. 170-183.

Symes, "A Differential Semblance Criterion for Inversion of Multioffset Seismic Reflection Data," TR92-18, May 1992, 51 pages.

"Tang et al., "Multidirectional Slowness Vector for Computing Angle Gathers from Reverse Time Migration," Geophysics, vol. 81, No. 2, Mar.-Apr. 2016, pp. S55-S68."

Tang et al., "RTM Angle Gathers with Gaussian Weighted Time-Lapse Poynting Vectors and Receiver Wavefield Reconstruction in Forward Time Direction," SEG Houston 2013 Annual Meeting, Copyright 2013, pp. 3779-3783.

Tonellot et al., "3D Quantitative AVA: Joint Versus Sequential Stratigraphic Inversion of Angle-Limited Stacks," SEG Int'l Exposition and 72nd Annual Meeting, Oct. 6-11, 2002, pp. 5.

Tura et al., "3-D AVO Migration/Inversion of Field Data," The Leading Edge, Nov. 1998, 5 pages.

Xu et al., "3D Angle Gathers from Reverse Time Migration," Geophysics, vol. 76, No. 2, Mar.-Apr. 2011, pp. S77-S92.

Yoon et al., "3D RTM Angle Gathers from Source Wave Propagation Direction and Dip of Reflector," SEG San Antonio 2011 Annual Meeting, Copyright 2011, pp. 3136-3140.

Yoon et al., "Reverse-Time Migration using the Poynting Vector," Exploration Geophysics, vol. 37, published in 2006, pp. 102-107.

Zhang et al., "Direct Vector-Field Method to Obtain Angle-Domain Common-Image Gathers from Isotropic Acoustic and Elastic Reverse Time Migration," Geophysics, vol. 76, No. 5, Sep.-Oct. 2011, 15 pages.

* cited by examiner

900

MODELING ANGLE DOMAIN COMMON IMAGE GATHERS FROM REVERSE TIME MIGRATION

TECHNICAL FIELD

This disclosure relates to seismic data processing and, more specifically, to modeling angle domain common image gathers from reverse time migration.

BACKGROUND

High resolution depth images of earth subsurface layers are important for reservoir exploration, delineation, and development. Wave equation based seismic depth migration techniques, such as reverse time migration (RTM), are suitable techniques for seismic depth imaging in the oil industry, especially in complex environments such as subsalt exploration. However, RTM is a computationally intensive process that requires propagating waves in 2D or 3D models using time or frequency domain wave equation solvers.

SUMMARY

The present disclosure describes methods and systems, including computer-implemented methods, computer program products, and computer systems for modeling angle domain common image gathers (ADCIG) from reverse time migration (RTM). One computer-implemented method for modeling ADCIG from RTM includes calculating seismic source and receiver wavefields based on seismic data, calculating characteristic source and receiver wavefields from the seismic source and receiver wavefields, calculating propagation angles for the characteristic source and receiver wavefields, applying a wavefield decomposition algorithm on the characteristic source and receiver wavefields to obtain corresponding directional source and receiver wavefields, the wavefield decomposition algorithm decomposing wavefield amplitude of a wavefield in an angle interval centered on a propagation angle of the wavefield, and forming ADCIG by applying an image condition to the obtained directional source and receiver wavefields.

Other implementations of this aspect include corresponding computer systems, apparatuses, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes the system to perform the actions. One or more computer programs can be configured to perform particular operations or actions by virtue of including instructions that, when executed by data processing apparatus, cause the apparatus to perform the actions.

The foregoing and other implementations can each, optionally, include one or more of the following features, alone or in combination:

A first aspect, combinable with the general implementation, wherein the seismic source and receiver wavefields are calculated using a time-domain wave equation solver.

A second aspect, combinable with any of the previous aspects, wherein the seismic source and receiver wavefields are calculated using a frequency-domain wave equation solver.

A third aspect, combinable with any of the previous aspects, wherein the ADCIG are formed using a RTM process.

A fourth aspect, combinable with any of the previous aspects, wherein the characteristic source and receiver wavefields are calculated for a plurality of predefined time steps with a first-order acoustic wave equation propagating model.

A fifth aspect, combinable with any of the previous aspects, wherein the characteristic source and receiver wavefields are calculated for a plurality of predefined time steps with a second-order acoustic wave equation propagating model.

A sixth aspect, combinable with any of the previous aspects, wherein the characteristic source wavefield has an absolute amplitude, at the propagation angle for the characteristic source wavefield, larger than an absolute amplitude at any other angles, and wherein the characteristic receiver wavefield has an absolute amplitude, at the propagation angle for the characteristic receiver wavefield, larger than an absolute amplitude at any other angles.

A seventh aspect, combinable with any of the previous aspects, wherein the angle interval is 1 degree, 5 degrees, or 15 degrees.

An eighth aspect, combinable with any of the previous aspects, wherein the image condition is a cross-correlation imaging condition.

A ninth aspect, combinable with any of the previous aspects, wherein the ADCIG are scattering angle gathers (SAG).

A tenth aspect, combinable with any of the previous aspects, wherein the ADCIG are dip angle gathers (DAG).

The details of one or more implementations of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

The patent or application file contains at least one drawing executed in color. Copies of this patent or patent application publication with color drawing(s) will be provided by the Patent and Trademark Office upon request and payment of the necessary fee.

Like reference numbers and designations in the various drawings indicate like elements.

DETAILED DESCRIPTION

Figure 1:
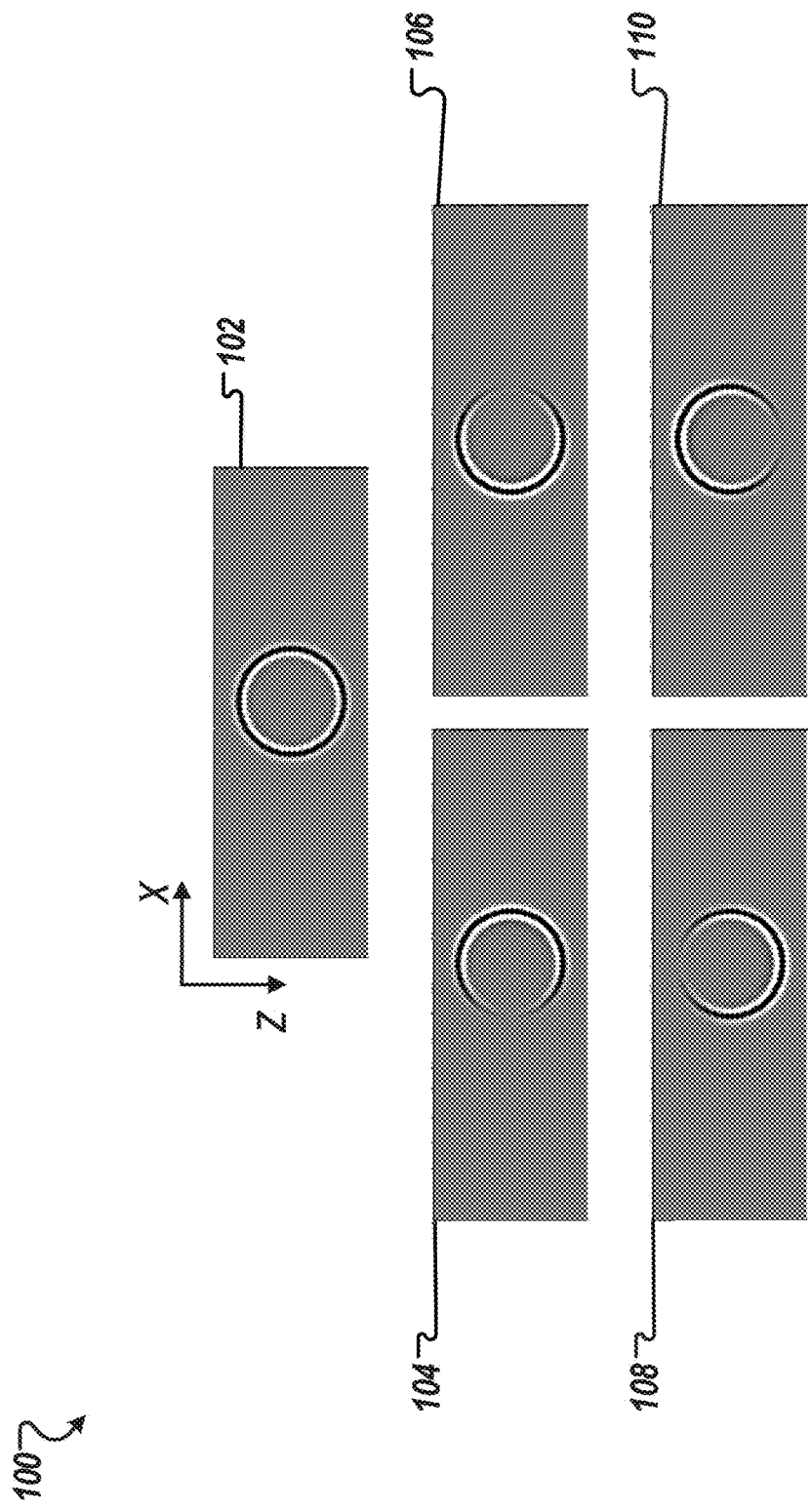
FIG. 1 illustrates example snapshots of a wavefield and its four characteristic wavefields, according to some implementations.

The following detailed description describes modeling angle domain common image gathers (ADCIG) from reverse time migration (RTM) and is presented to enable any person skilled in the art to make and use the disclosed subject matter in the context of one or more particular implementations. Various modifications, alterations, and permutations of the disclosed implementations can be made and will be readily apparent to those skilled in the art, and the general principles defined may be applied to other implementations and applications without departing from scope of the disclosure. Thus, the present disclosure is not intended to be limited to the described or illustrated implementations, but is to be accorded the widest scope consistent with the principles and features disclosed.

High resolution depth images of earth subsurface layers are important for successful reservoir exploration, delineation, and development. Wave equation based seismic depth migration techniques, such as RTM, are suitable techniques for seismic depth imaging in the oil industry, especially in complex environments such as subsalt exploration. However, RTM is a computationally intensive process that requires propagating waves in 2D or 3D models using time or frequency domain wave equation solvers.

Given a model of the subsurface and seismic data recorded at known receiver locations, an image of the subsurface can be formed by combining, with an imaging condition, the forward propagated source wavefield with the backward propagated receiver wavefield. When the imaging condition is a function of an additional parameter, common image gathers can be formed. ADCIG are particularly important among various common image gathers, and can be divided into two kinds of gathers, namely, the scattering angle gathers (SAG) and the dip angle gathers (DAG).

In general, two types of methods can be used to compute ADCIG from RTM, namely, local plane wave decomposition based methods and direction vector based methods. Local plane wave decomposition based methods are accurate, but computationally expensive due to the need to perform a plane wave decomposition for each grid point. Direction vector based methods are computationally efficient (e.g., the Poynting vector method (Yoon and Marfurt, 2006)), but can be unstable for complicated wavefields with intersecting events (Patrikeeva and Sava, 2013).

At a high level, the described approach is a direction vector based method. The described ADCIG computation method uses the characteristic directional wavefield of a first order wave system to compute the propagation angle (or propagation direction), decompose the full wavefields in an interval of angle centered on the propagation angle, and compute ADCIG based on the decomposed wavefields. The decomposition over the interval of angle centered on the propagation angle acts as a smoothing process in the angle domain, and can stabilize the decomposition process even for complicated wavefields with intersecting events. As a result, the described ADCIG computation method can produce accurate and computationally affordable ADCIG from RTM.

The example ADCIG computation method, described in the present disclosure, can achieve one or more advantages. First, the computation cost of the ADCIG computation method is low and comparable to the computation cost of the Poynting vector method (discussed in more detail below). Second, the proposed method is robust even in complicated wavefields, since the ADCIG computation method is fully based on quantity computed during the forward modelling. Assuming that the propagation is performed using appropriate grid spacing, the velocity and pressure wavefields are sufficiently accurate to perform the wavefield decomposition in complicated wavefields. Third, the proposed method can be applied to more complex propagation models, such as anisotropic and/or elastic propagation models. Fourth, the proposed method can be applied to Full Waveform Inversion (FWI). Since the ADCIG computation method can compute accurate ADCIG, the method can be applied to a select part of the wavefield (e.g., diving waves, reflections only) that needs to be considered in the FWI. In some applications, the example ADCIG computation method can achieve additional or different advantages.

Generally, the 2D isotropic first-order (e.g., velocity-pressure) acoustic wave system, according to Metivier et al., 2014, is expressed as:

$$\frac{\partial u}{\partial t} + A \frac{\partial u}{\partial x} + B \frac{\partial u}{\partial z} = f \quad (1)$$

where t denotes time, (x, z) denotes the 2-dimensional space coordinate, f is a source term, and u(x, z; t) (which is denoted as u in Equation (1) and below for brevity) stands for the wavefield time-space domain. Although this disclosure refers to the 2D isotropic first-order acoustic wave system for purposes of example, the subject matter of this document can be applied to other types of acoustic wave systems, including the 3D propagation system.

If $v_x(x, z; t)$ and $v_z(x, z; t)$ (which are denoted respectively as $v_x$ and $v_z$ below for brevity) denote the horizontal and vertical velocity displacement wavefields respectively, p(x, z; t) (which is denoted as p below for brevity) denotes the pressure wavefield (i.e., the wavefield, unless otherwise indicated), and $c_0$ and $\rho_0$ are the local P-wave velocity and density respectively, the following can be derived from Equation (1):

$$u = [v_x \ v_z \ p]^T, \quad (2)$$

$$A = -\begin{pmatrix} 0 & 0 & \frac{1}{\rho_0} \\ 0 & 0 & 0 \\ \rho_0 c_0^2 & 0 & 0 \end{pmatrix} \text{ and }$$

$$B = -\begin{pmatrix} 0 & 0 & 0 \\ 0 & 0 & \frac{1}{\rho_0} \\ 0 & \rho_0 c_0^2 & 0 \end{pmatrix}$$

The matrices A and B are diagonalizable with the same eigenvalues $(0, -c_0, c_0)$ as:

$$A = P^{-1} \cdot D \cdot P \text{ and } B = Q^{-1} \cdot D \cdot Q \qquad (3)$$

where $$D = \begin{pmatrix} 0 & 0 & 0 \\ 0 & -c_0 & 0 \\ 0 & 0 & c_0 \end{pmatrix}, P = \begin{pmatrix} 0 & 1 & 0 \\ \frac{\rho_0 c_0}{2} & 0 & \frac{1}{2} \\ -\frac{\rho_0 c_0}{2} & 0 & \frac{1}{2} \end{pmatrix} \text{ and} \qquad (4)$$

$$Q = \begin{pmatrix} 1 & 0 & 0 \\ 0 & \frac{\rho_0 c_0}{2} & \frac{1}{2} \\ 0 & -\frac{\rho_0 c_0}{2} & \frac{1}{2} \end{pmatrix}$$

The eigenvectors of the matrices A and B are associated with positive eigenvalues if the wavefield is propagating with positive velocities in the directions of the x and z axes, respectively (e.g., upward). On the other hand, the eigenvectors of the matrices A and B are associated with negative eigenvalues if the wavefield is propagating in the opposite directions of the x and z axes, respectively (e.g., downward).

Four characteristic wavefields can be obtained by decomposing the total pressure wavefield (i.e., p) into the four directions (i.e., the direction of x axis, the opposite direction of x axis, the direction of z axis, the opposite direction of z axis):

$$w_x^+ = \tfrac{1}{4}(p - \rho_0 c_0 v_x) \qquad (5)$$

$$w_x^- = \tfrac{1}{4}(p + \rho_0 c_0 v_x) \qquad (6)$$

$$w_z^+ = \tfrac{1}{4}(p - \rho_0 c_0 v_x) \qquad (7)$$

$$w_z^- = \tfrac{1}{4}(p + \rho_0 c_0 v_x) \qquad (8)$$

where $p = w_x^+ + w_x^- + w_z^+ + w_z^-$.

FIG. 1 illustrates example snapshots 100 of a wavefield and its four characteristic wavefields, according to some implementations. For example, a model with constant P-velocity equal to 4000 m/s (meter/second) is simulated (e.g., wave propagation in a homogenous model). A 15 Hz (hertz) Ricker source is applied in the center location of the 2-dimensional space coordinate (x, z) at t=0 ms (millisecond). The wave propagation is implemented using a staggered grid time domain finite difference solver, based on a first order wave equation.

FIG. 1 illustrates, at t=250 ms, a snapshot of the total wavefield 102, a snapshot of the directional wavefield $w_x^+$ 104, a snapshot of the directional wavefield $w_x^-$ 106, a snapshot of the directional wavefield $w_z^+$ 108, and a snapshot of the directional wavefield $w_z^-$ 110. The four directional wavefields $w_x^+$, $w_x^-$, $w_z^+$, and $w_z^-$ are computed using Equations (5) to (8), respectively. For illustration purposes, amplitudes of the wavefields $w_x^+$, $w_x^-$, $w_z^+$, and $w_z^-$ in snapshots 104, 106, 108, and 110, respectively, are multiplied by a factor of 4. As illustrated, the decomposed wavefield amplitudes are maximum or above a predefined threshold in the main direction of propagation from the center location, compared to amplitudes in other directions. For example, in the snapshot 104, the main direction of propagation is the direction of the x axis, and amplitudes of the wavefield $w_x^+$ are maximum or above a predefined threshold in the direction of the x axis from the center location. In the other directions, amplitudes decrease smoothly as the angle between the other direction and the main direction of propagation increases, and reach a minimum amplitude or an amplitude below a predefined threshold in the direction opposite to the main direction of propagation. For example, in the snapshot 104, amplitudes of the wavefield $w_x^+$ reach a minimum amplitude or an amplitude below a predefined threshold in the opposite direction of the x axis from the center location.

Similar to decomposing the wavefield (i.e., the total pressure wavefield) into four characteristic wavefields (i.e., characteristic wavefields in Equations (5) to (8)), the upward and backward wavefields propagating in any given direction θ (i.e., $w_\theta^+$ and $w_\theta^-$, respectively) can be constructed by decomposing the wavefield into the direction θ. For example, applying a rotation of angle θ to the eigenvectors of the matrices A and B, assuming that the angle θ is measured clockwise with respect to z axis, the rotated upward and backward wavefields can be obtained as:

$$w_\theta^+ = \tfrac{1}{4}(p - \rho_0 c_0 (v_z \cos(\theta) + v_x \sin(\theta))) \qquad (9)$$

$$w_\theta^- = \tfrac{1}{4}(p + \rho_0 c_0 (v_z \cos(\theta) + v_x \sin(\theta))) \qquad (10)$$

Figure 2:
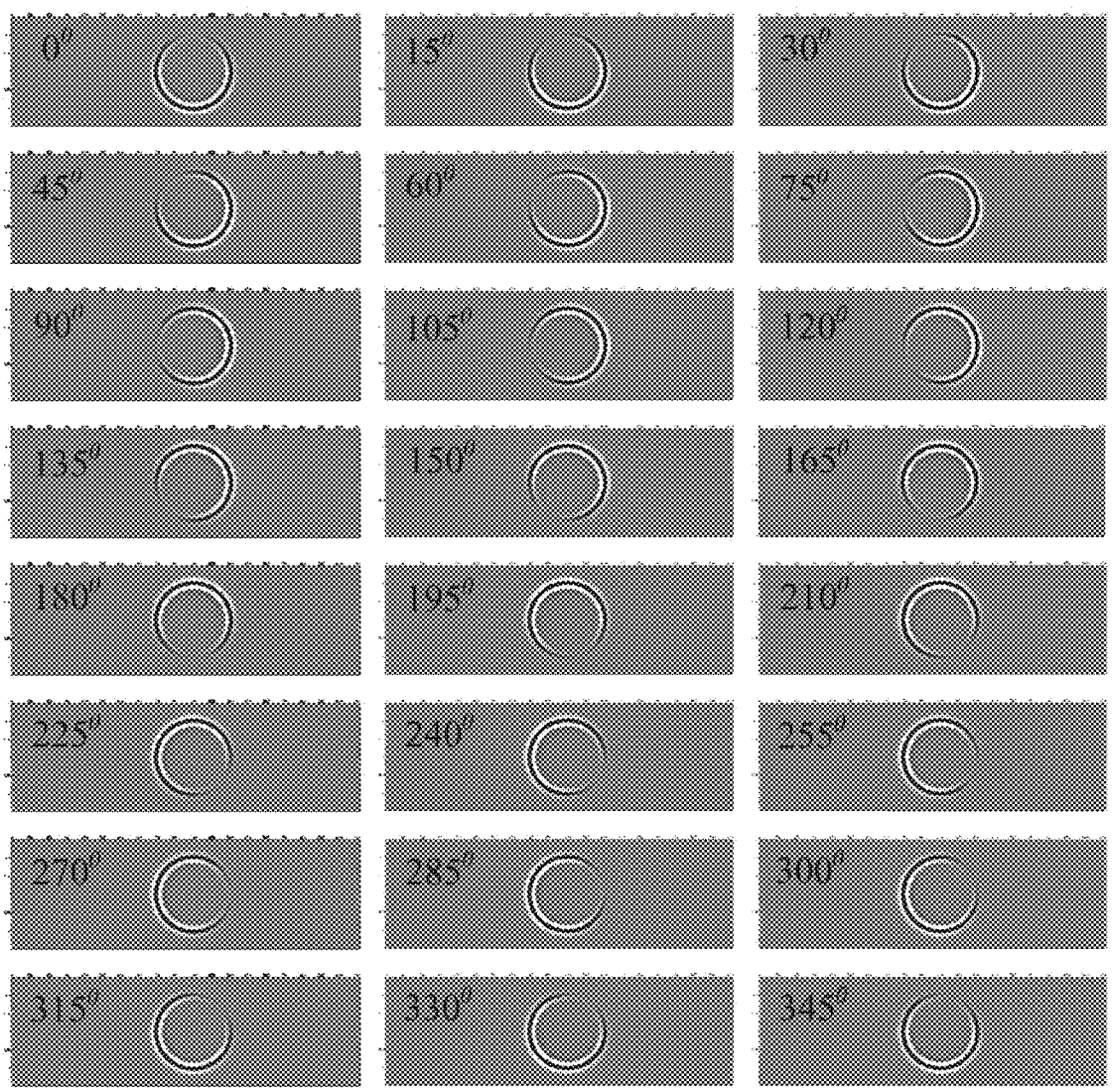
FIG. 2 illustrates example snapshots of a rotated characteristic wavefield, according to some implementations.

FIG. 2 illustrates example snapshots 200 of a rotated characteristic wavefield, according to some implementations. In FIG. 2, the wavefield 102 in FIG. 1 is decomposed using, for example, Equation (9) into the direction θ. FIG. 2 illustrates, at t=250 ms, snapshots of the decomposed rotated upward wavefield (i.e., $w_\theta^+$) from 0 to 360 degrees with a 15-degree sampling.

In the present disclosure, the characteristic wavefield, for example, obtained from Equation (9) is used to compute an instantaneous source propagation angle for the source wavefield (e.g., upward) and an instantaneous receiver propagation angle for the receiver wavefield (e.g., downward), decompose the source wavefield by a direction of the instantaneous source propagation angle and decompose the receiver wavefield by a direction of the instantaneous receiver propagation angle, and finally compute angle domain common image gathers (ADCIG) using the decomposed source and receiver wavefields. Although this disclosure refers to the upward and downward decomposition, for purposes of example, the subject matter of this document can be applied to 3D propagation, leading to the introduction of a dip and azimuth angle or extended to more complex propagation physics, such as anisotropic or elastic propagation. For example, techniques described in Metivier et al., 2014 can be used for application of the above decomposition technique to "smart" absorbing layers for anisotropic and elastic propagations.

Instantaneous Propagation Angle Estimation:

According to Equation (9) and illustrated in FIG. 2, $w_\theta^+$ provides, at any given time and any spatial position, amplitude of the wavefield propagating in the direction θ. Amplitudes of the wavefield $w_\theta^+$ are maximum or above a predefined threshold in the direction θ, compared to amplitudes in directions other than θ. Waves propagating in directions other than θ are attenuated with a maximum attenuation or an attenuation above a predefined threshold in the direction -θ. Therefore, the instantaneous wavefield propagation direction can be obtained by finding an angle where $w_\theta^+$ has a maximum absolute amplitude or an absolute amplitude above a predefined threshold. This angle corresponds to an angle where the derivative of $w_\theta^+$ is equal to zero. Applying trigonometric computations to Equation (9) gives:

$$\frac{\partial w_\theta^+}{\partial \theta} = \frac{1}{4}(\rho_0 c_0(-v_z \sin(\theta) + v_x \cos(\theta))) \quad (11)$$

where $$\frac{\partial w_\theta^+}{\partial \theta}$$

is equal to zero for the two following angles:

$$\theta_0 = \tan^{-1}\left(\frac{vx}{vz}\right) \text{ and } \theta_1 = \tan^{-1}\left(\frac{vx}{vz}\right) + \pi \quad (12)$$

As a result, the instantaneous direction of propagation of the wavefield is given by:

$$\theta_{propa} = \begin{cases} \theta_0 & \text{if } |w_{\theta_0}^+| \geq |w_{\theta_1}^+| \\ \theta_1 & \text{if } |w_{\theta_0}^+| < |w_{\theta_1}^+| \end{cases} \quad (13)$$

Computing the propagation angle using Equations (11) to (13) is comparable to the Poynting vector method (Yoon and Marfurt, 2006). However, the method using Equations (11) to (13) does not include any time derivatives of the pressure wavefield, and hence, there is no need, in some implementations, to access multiple time steps.

Figure 3:
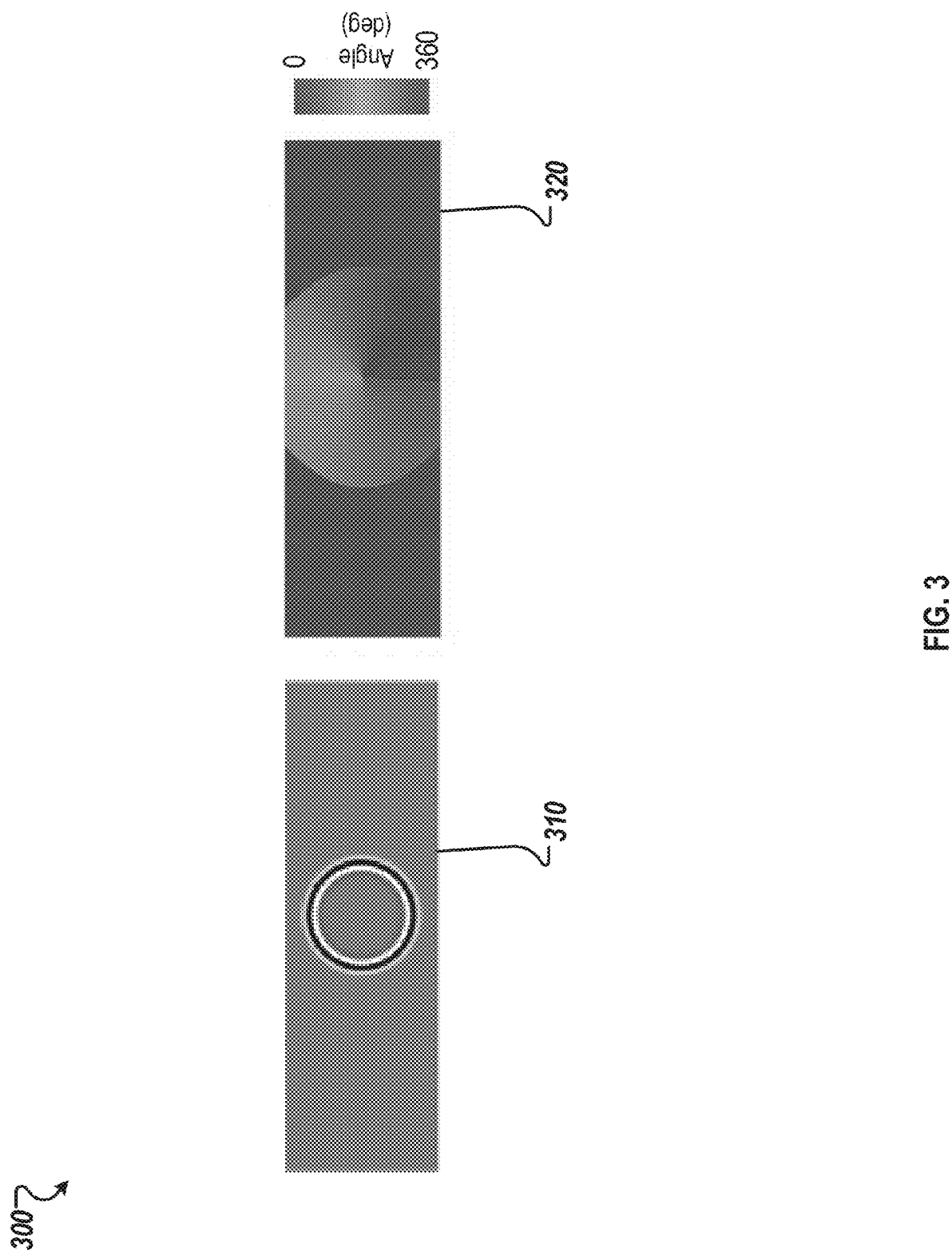
FIG. 3 illustrates example results of propagation angle estimation, according to some implementations.

FIG. 3 illustrates example results 300 of propagation angle estimation, according to some implementations. In FIG. 3, the wavefield 310 (same as the wavefield 102 in FIG. 1) is used for propagation angle estimation, according to Equation (13). The results 320 are the estimated propagation angle.

Wavefield Decomposition by Propagation Angle Direction:

Several methods can be used to decompose the wavefield by propagation angle direction. A first method uses the rotated characteristic wavefield $w_\theta^+$ in Equation (9) directly. However, as illustrated in FIGS. 1 and 2, the decomposition using the first method may not sufficiently attenuate the waves propagating in directions other than θ. As a result, the first decomposition method can be insufficient for some wavefield decomposition applications.

A second method to decompose the wavefield by propagation angle direction consists first of computing the propagation angle $\theta_{propa}$ at each location, and then of assigning amplitude at this location to the propagation angle $\theta_{propa}$. However, the second method can be unstable due to the nature of $\tan^{-1}$. As a result, the second decomposition method can result in instability in complex or noisy situations.

A third method (i.e., the preferred method) consists of increasing the directional discrimination of $w_\theta^+$ (i.e., $w_\theta^+(x, z; t)$ in Equation (14) and below) by decomposing the amplitude over an interval of angle centered on the propagation angle given by Equation (13). A windowing function defines the angle interval. An example of such a windowing function is the Gaussian function $g_\theta^+(x, z; t)$:

$$g_\theta^+(x, z; t) = \exp\left[-\frac{1 - \left(\frac{w_\theta^+(x, z; t)}{\max_\theta |w_\theta^+(x, z; t)|}\right)^2}{\sigma^2}\right] \quad (14)$$

where σ is a parameter controlling the width of the angle interval. The smaller σ is, the more directional the decomposition will be. Although this disclosure refers to the Gaussian function for purposes of example, the subject matter of this document can use other functions to define the windowing function $g_\theta^+(x, z; t)$.

σ can be defined, for example, using the following formula:

$$\sigma = \frac{1 - \cos L_\theta}{\sqrt{\ln q}} \quad (15)$$

where $L_\theta = N_w \Delta\theta$ is smoothing window size, $N_w$ is the number of points defining the window, $\Delta\theta$ is the angle resolution, and q is a parameter controlling the amplitude attenuation beyond $\Delta\theta$ In some implementations, q is usually set to 0.01. The pressure wavefield in the direction $\theta(V_\theta^+(x, z; t))$ can then be obtained by forming the following quantity:

$$V_\theta^+(x,z;t) = g_\theta^+(x,z;t)p(x,z;t) \quad (16)$$

With Equation (16), the sum of $V_\theta^+$ (x, z; t) over the angles may not be equal to the total pressure wavefield (p(x, z; t)). Therefore, the function $g_\theta^+$ (x, z; t) needs to be normalized to eliminate the inequality problem. The normalization process is performed by first numerically computing:

$$E(x,z;t) = \int_0^{2\pi} g_\theta^+(x,z;t)d\theta \quad (17)$$

and then forming the decomposed wavefield in the direction θ as:

$$W_\theta^+(x, z; t) = \frac{g_\theta^+(x, z; t)}{E(x, z; t)} p(x, z; t) \quad (18)$$

If σ is very small, then the entire wavefield p(x, z; t) is associated with the angle θ. For other values of σ, the wavefield p(x, z; t) is spread over the angles near the angle θ. With the smoothing parameter σ in the angle domain, the stability and robustness of the proposed wavefield decomposition by propagation angle direction (e.g., Equation (18)) can be improved.

Figure 4:
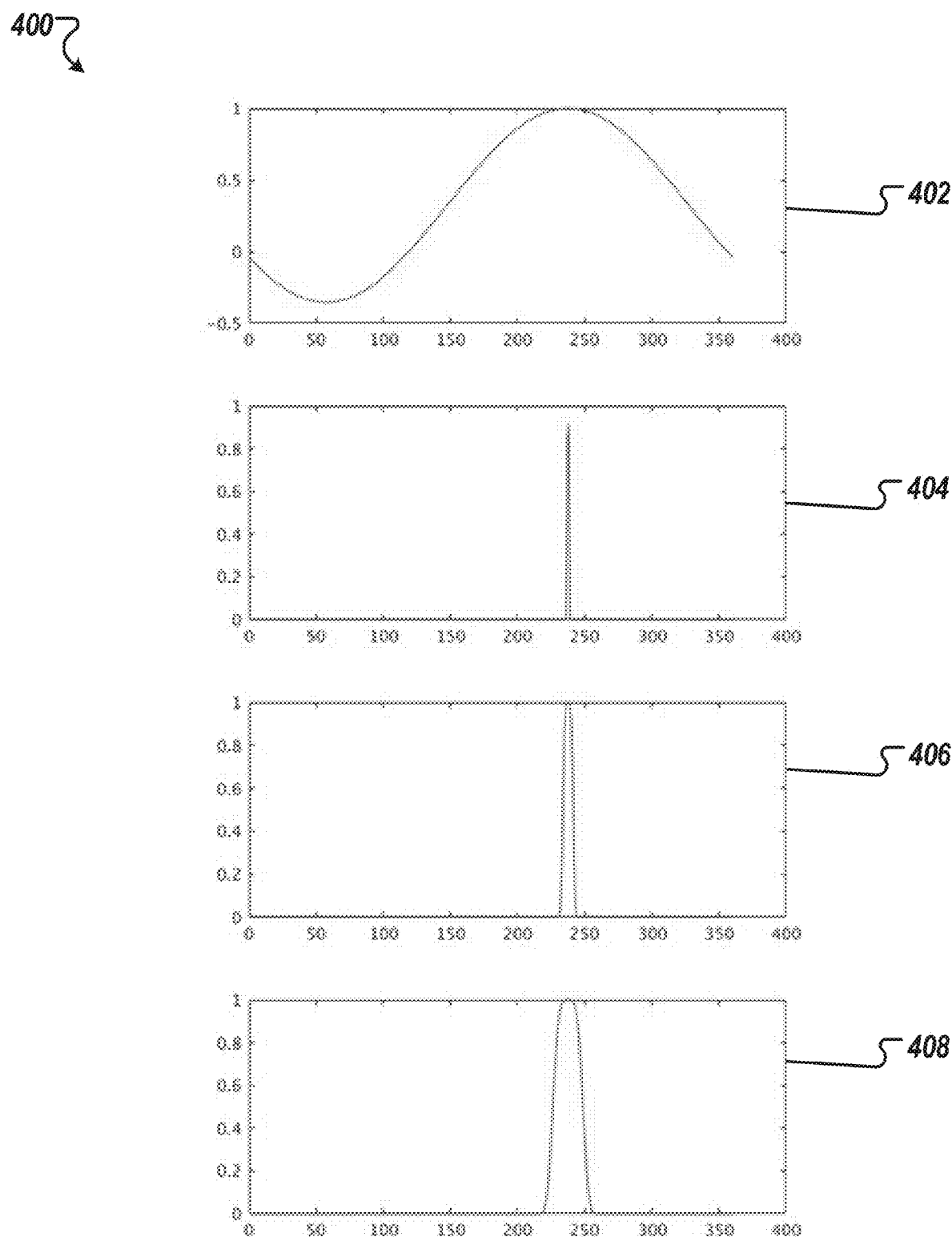
FIG. 4 illustrates example wavefield and wavefields for value of a smoothing parameter associated with various angle intervals, according to some implementations.

FIG. 4 illustrates example wavefield and wavefields 400 for value of a smoothing parameter associated with various angle intervals, according to some implementations. 402 shows an example of a rotated characteristic wavefield $w_\theta^+$. 404 shows $W_\theta^+$ for value of σ associated with a window length equals to the angle resolution (1 degree). 406 shows $W_\theta^+$ for value of σ associated with a window length equals to 5 angle resolution (5 degrees). 408 shows $w_\theta^+$ for value of σ associated with window length equals to 15 angle resolution (15 degrees).

Decomposition over an interval of angle can then be performed by summing the directional wavefields over the required interval.

Figure 5:
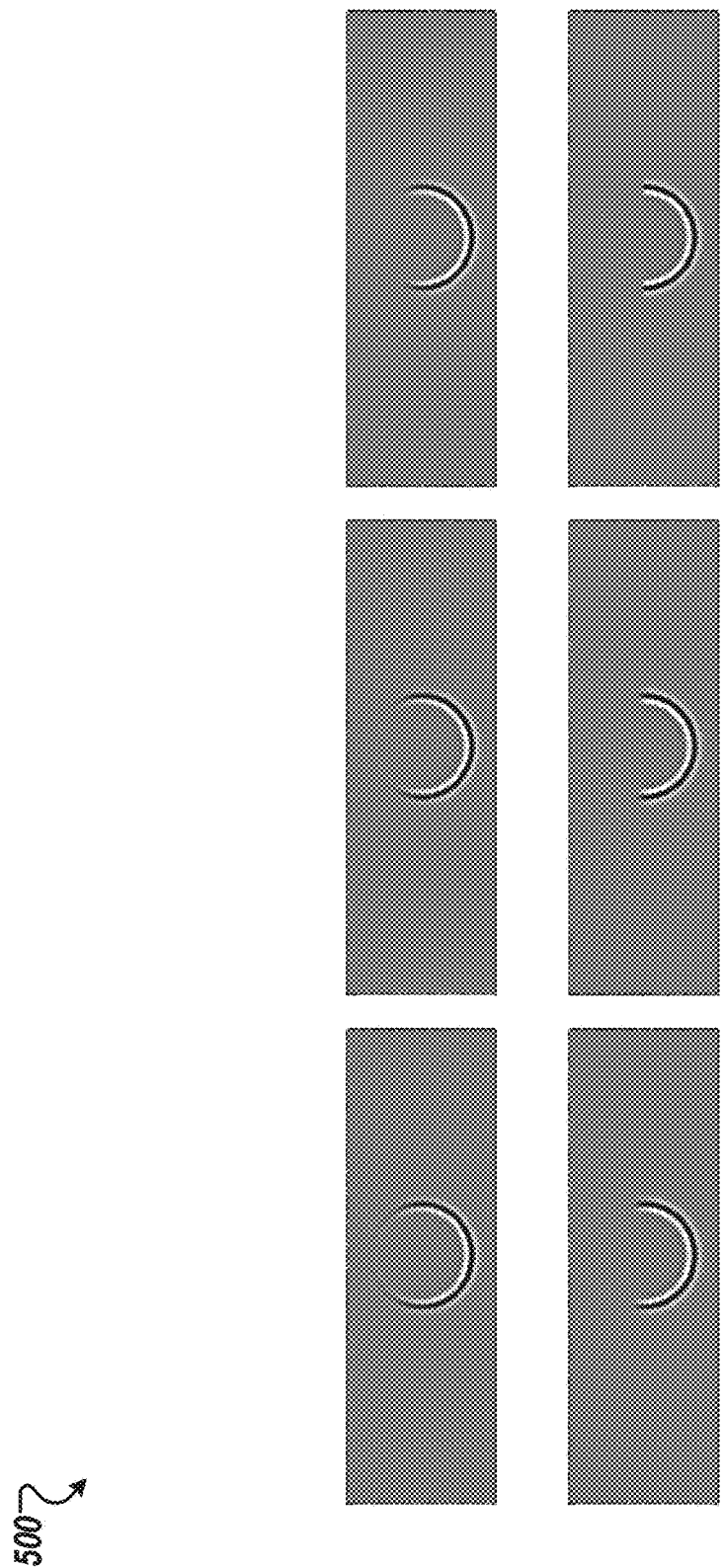
FIG. 5 illustrates example effects of decreasing a smoothing parameter on a decomposed wavefield, according to some implementations.

FIG. 5 illustrates example effects 500 of decreasing a smoothing parameter on a decomposed wavefield, according to some implementations. As illustrated in FIG. 5, from top left to bottom right, the effect of decreasing σ on the decomposed wavefield $W_\theta^+$ using the two angles 0 and 180 degrees (i.e., up and down decomposition) in Equation (18) is shown.

Figure 6:
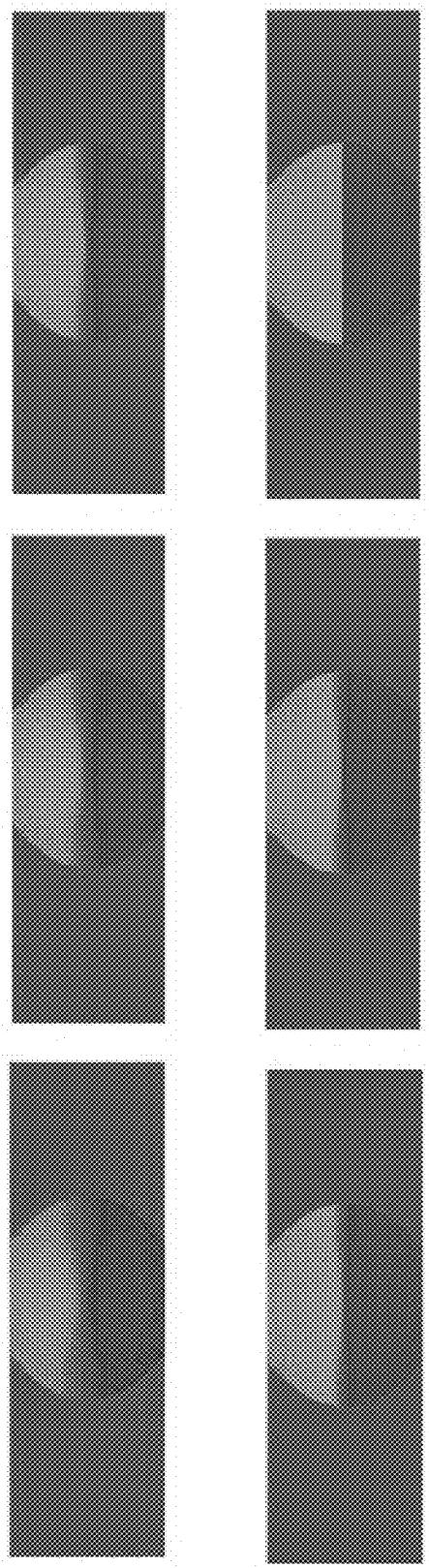
FIG. 6 illustrates example effects of decreasing a smoothing parameter on a propagation angle in a decomposed wavefield, according to some implementations.

FIG. 6 illustrates example effects 600 of decreasing a smoothing parameter on a propagation angle in a decomposed wavefield, according to some implementations. As illustrated in FIG. 6, from top left to bottom right, the effect of decreasing σ on the propagation angle in the decomposed wavefield $W_\theta^+$ using the two angles 0 and 180 degrees (i.e., up and down decomposition) in Equation (18) is shown.

Figure 7:
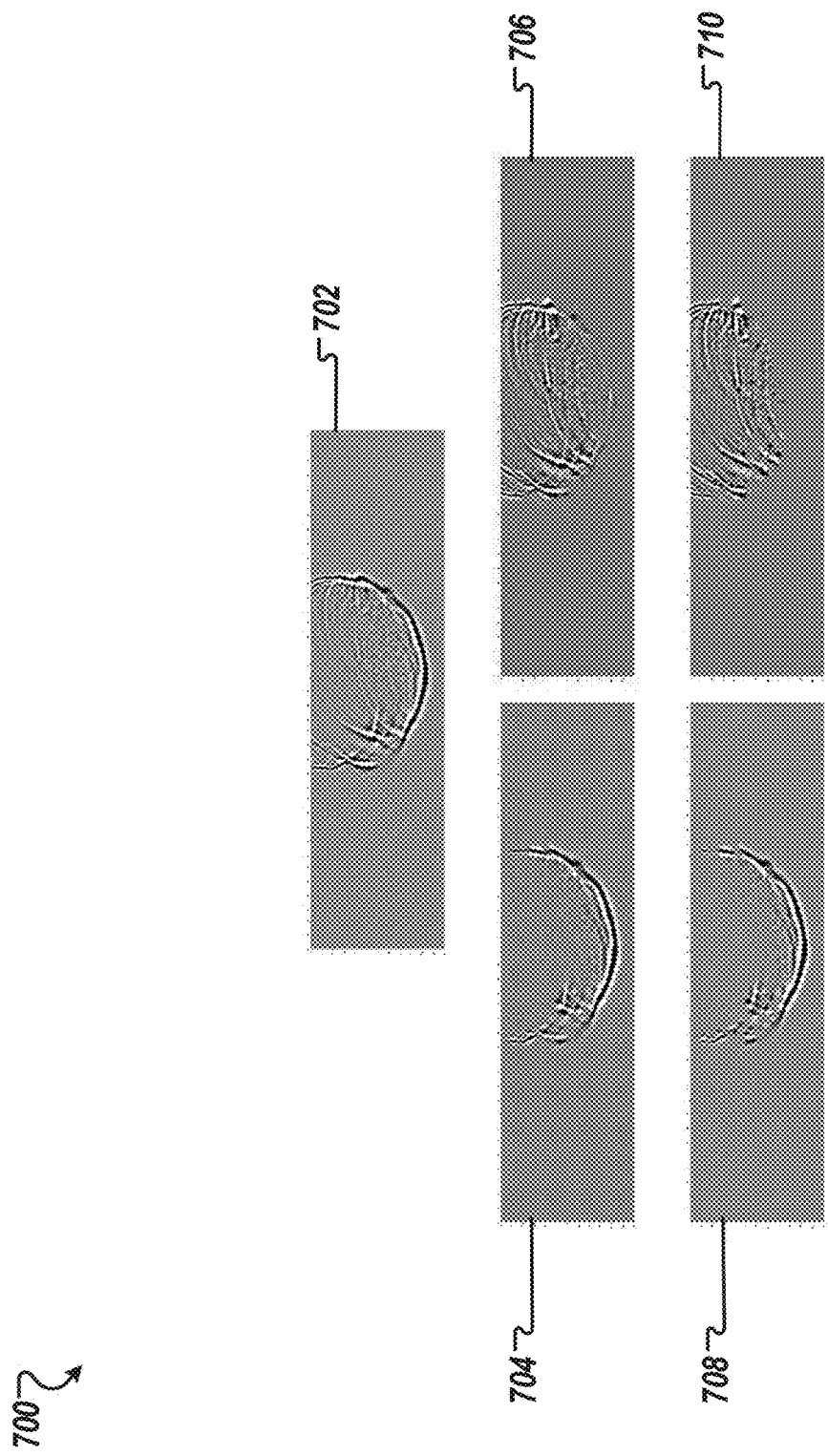
FIG. 7 illustrates example snapshots of a pressure wavefield propagating in the Marmousi model, according to some implementations.

FIG. 7 illustrates example snapshots 700 of a pressure wavefield propagating in the Marmousi model, according to some implementations. FIG. 7 illustrates a snapshot of the full wavefield 702, a snapshot of the downward wavefield decomposition 704 using Equation (18) with an average amount of smoothing σ, a snapshot of the upward wavefield decomposition 706 using Equation (18) with the average amount of smoothing σ, a snapshot of the downward wavefield decomposition 708 using Equation (18) with a very small amount of smoothing σ, and a snapshot of the upward wavefield decomposition 710 using Equation (18) with the very small amount of smoothing σ. As illustrated in 708 and 710, there exist instabilities and noises associated with small values of the smoothing parameter σ. In some implementations, the value of σ is set according to the sampling in angle of the function, for example, $w_\theta^+$. Assuming, for example, that $w_\theta^+$ is sampled every 1 degree, a small σ corresponds to a smoothing window of 1 degree, an average σ corresponds to a smoothing window of 3 to 5 degrees, and a large σ corresponds to a smoothing window of 10 or more degrees.

Figure 8:
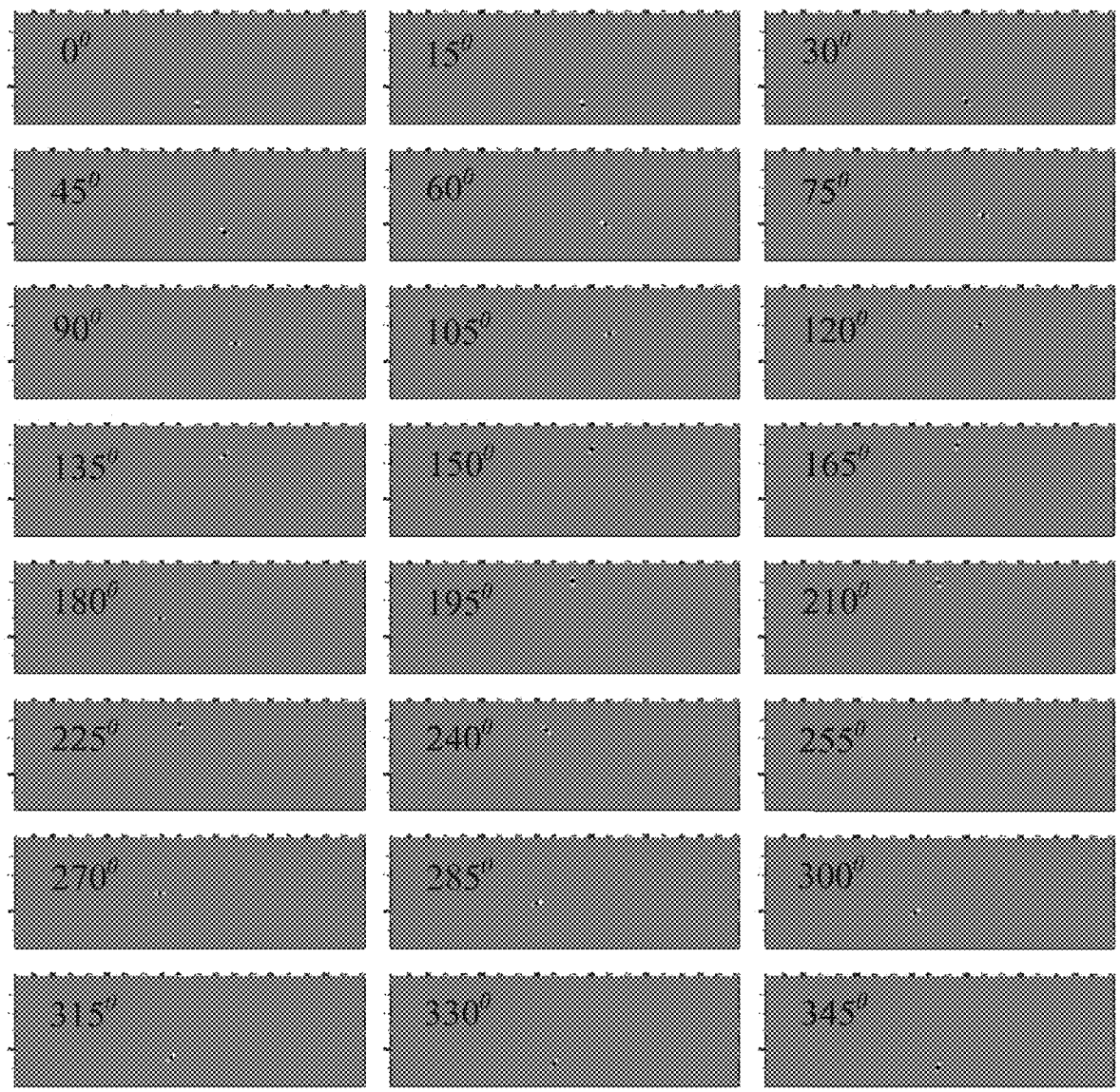
FIG. 8 illustrates example snapshots of directional wavefields, according to some implementations.

FIG. 8 illustrates example snapshots 800 of directional wavefields, according to some implementations. In FIG. 8, the wavefield 102 in FIG. 1 is decomposed using, for example, Equation (18) with an interval of 5 degrees. FIG. 8 illustrates, at t=250 ms, snapshots of the decomposed wavefield $W_\theta^+$ from 0 to 360 degrees with a 15-degree sampling.

ADCIG Computation:

In the present disclosure, the wavefield decomposition presented in the previous section (e.g., Equation (18)) is used to compute ADCIG. Without loss of generality, the conventional cross-correlation imaging condition is used for wave equation migration to form an image as:

$$I(x,z) = \sum_{s=1}^{N_{shots}} \sum_{t=1}^{N_t} W_{src}(s;x,z;t) W_{rcv}(s;x,z;t) \quad (19)$$

where I(x, z) represents the image at (x, z) acquired through migration, $N_{shots}$ is the number of shots considered for ADCIG computation, $N_t$ is the number of time steps, and $W_{src}$ and $W_{rcv}$ are the source and receiver wavefields, respectively. Although this disclosure refers to the conventional cross-correlation imaging condition, for purposes of example, the subject matter of this document can use other imaging conditions for ADCIG computation without departing from the scope of the disclosure. The imaging condition used in Equation (19) can be extended to compute ADCIG, including scattering angle gathers (SAG) and dip angle gathers (DAG) by forming the quantities as:

$$SAG\left(x, z; \frac{\theta_{rcv} - \theta_{src}}{2}\right) = \quad (20)$$

$$\sum_{s=1}^{N_{shots}} \sum_{t=1}^{N_t} W_{src}(s; x, z; t; \theta_{src}) W_{rcv}(s; x, z; t; \theta_{rcv}) \text{ and}$$

$$DAG\left(x, z; \frac{\theta_{rcv} + \theta_{src}}{2}\right) = \quad (21)$$

$$\sum_{s=1}^{N_{shots}} \sum_{t=1}^{N_t} W_{src}(s; x, z; t; \theta_{src}) W_{rcv}(s; x, z; t; \theta_{rcv})$$

The source and receiver angle wavefields (i.e., $W_{src}$ (s; x, z; t; $\theta_{src}$) and $w_{rcv}$ (s; x, z; t; $\theta_{rcv}$) in Equations (20) and (21)) are computed, for example, by application of the directional wavefield decomposition (e.g., Equation (18)) to the source and receiver wavefields, to compute the SAG and DAG at the desired angles.

In general, standard reverse time migration (RTM) implementations are based on second order pressure wave equations. For acoustic RTM, stacked image computations require two forward modellings (source and receiver) and storing the pressure snapshots of the pressure wavefield (1 grid) at the time steps where the imaging condition is computed.

In 2D systems, using an acoustic isotropic time domain finite difference modelling and a cross-correlation imaging condition, the number of operations required by a standard RTM ($N_{rtm}$) is approximately:

$$Nrtm = 2*Ngrid*Nop*Nt + 2*Ngrid*Nsnp \quad (22)$$

with $N_{grid}$ being the number of grid points, $N_{op}$ being the number of kernel operations per grid point, $N_t$ being the number of modelling time steps, and $N_{snp}$ being the number of snapshots. Assuming a second order wave system with $16^{th}$ order stencil in space, the number of kernel operation per grid point is $N_{op}$=53.

To apply the ADCIG computation method in the present disclosure (e.g., Equation (19)), two forward modellings are computed using a first-order (velocity-pressure) acoustic wave system. In addition to the pressure wavefield, the variables necessary to compute the characteristic wavefield in all directions are stored. For example, in 2D systems, the particle velocities $v_x$ and $v_z$ are stored, while $v_x$, $v_y$, and $v_z$ are stored in 3D systems. To compute the imaging condition, the ADCIG computation method in the present disclosure requires computing the propagation angle for the source and receiver wavefields, computing the windowed angle decomposition, and forming the angle gathers. The number of operation for the ADCIG computation method in the present disclosure ($N_{meth}$) is approximately:

$$Nmeth = 2*Ngrid*Nop*Nt + 2*(Nw+15)*Ngrid*Nsnp \quad (23)$$

with $N_w$ being the number of angles defining the windowing function $g_\theta^+$. The number 15 corresponds to the approximate cost of the function arcTan used to obtain the propagation angle (e.g., in Equation (12)). When $N_w$ is equal to one, the computation cost of the ADCIG computation method is the same as the Poynting vector method (e.g., without spatial smoothing). In practice, $N_w$ is small (e.g., 5 to 10), and the computation cost of the ADCIG computation method with small $N_w$ is low and comparable to the computation cost of the Poynting vector method.

Figure 9:
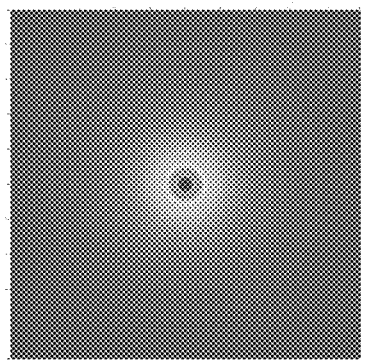
FIG. 9 illustrates example images on a homogenous model, according to some implementations.
Figure 9:
Figure 9:
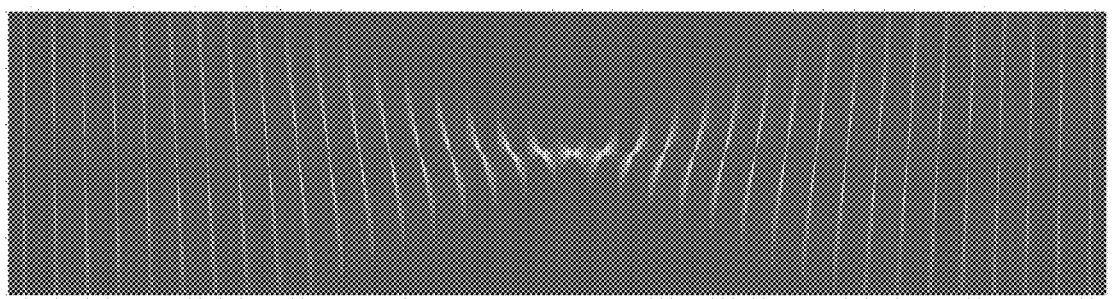
Figure 9:
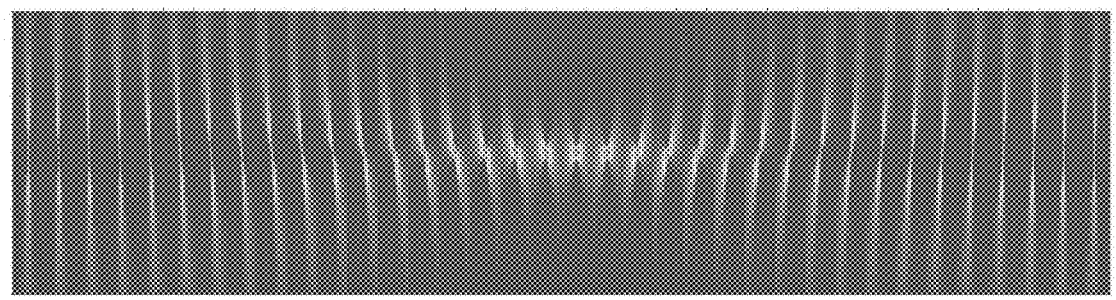

FIG. 9 illustrates example images 900 on a homogenous model, according to some implementations. In FIG. 9, a homogenous model is considered. The migrated data corresponds to one shot located at the center of the model. Receivers are located all around the model. Dips vary from 0 to 360 degrees with a 10-degree interval. The corresponding image (stacked image) is shown on the top of FIG. 9. The three dip angle gathers (DAG) are shown below the stacked image in FIG. 9, and all three DAG give the same stacked image. Illustrated in FIG. 9 from top to bottom, the three DAG use increasing smoothing parameter σ.

FIGS. 10-14 illustrate example images on a dipping layer model, according to some implementations. In FIGS. 10-14, a homogenous background with a layer forming a 4.3-degree angle with the horizontal and three diffraction points located above the layer are considered.

Figure 10:
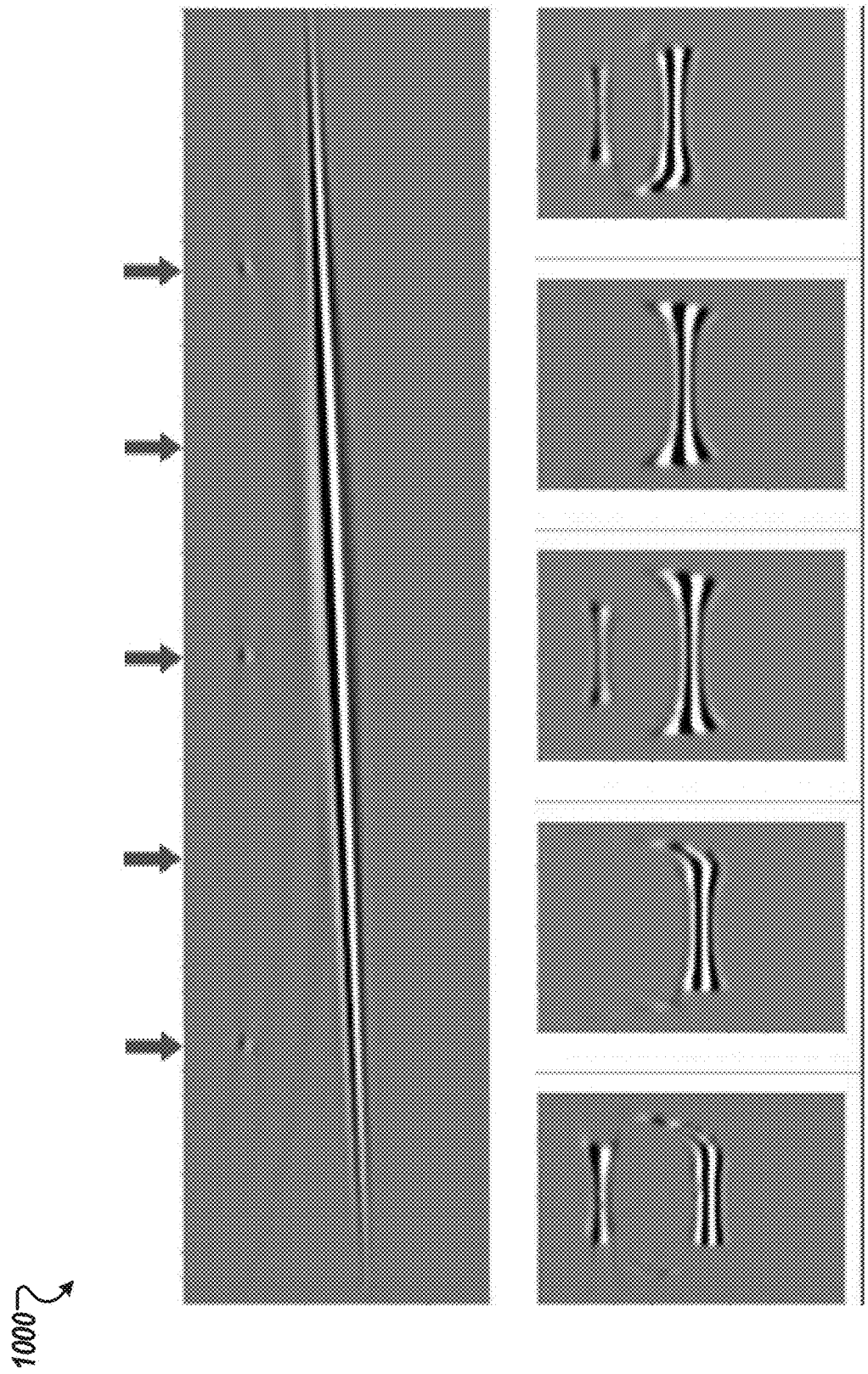
FIGS. 10-14 illustrate example images on a dipping layer model, according to some implementations.
Figure 11:
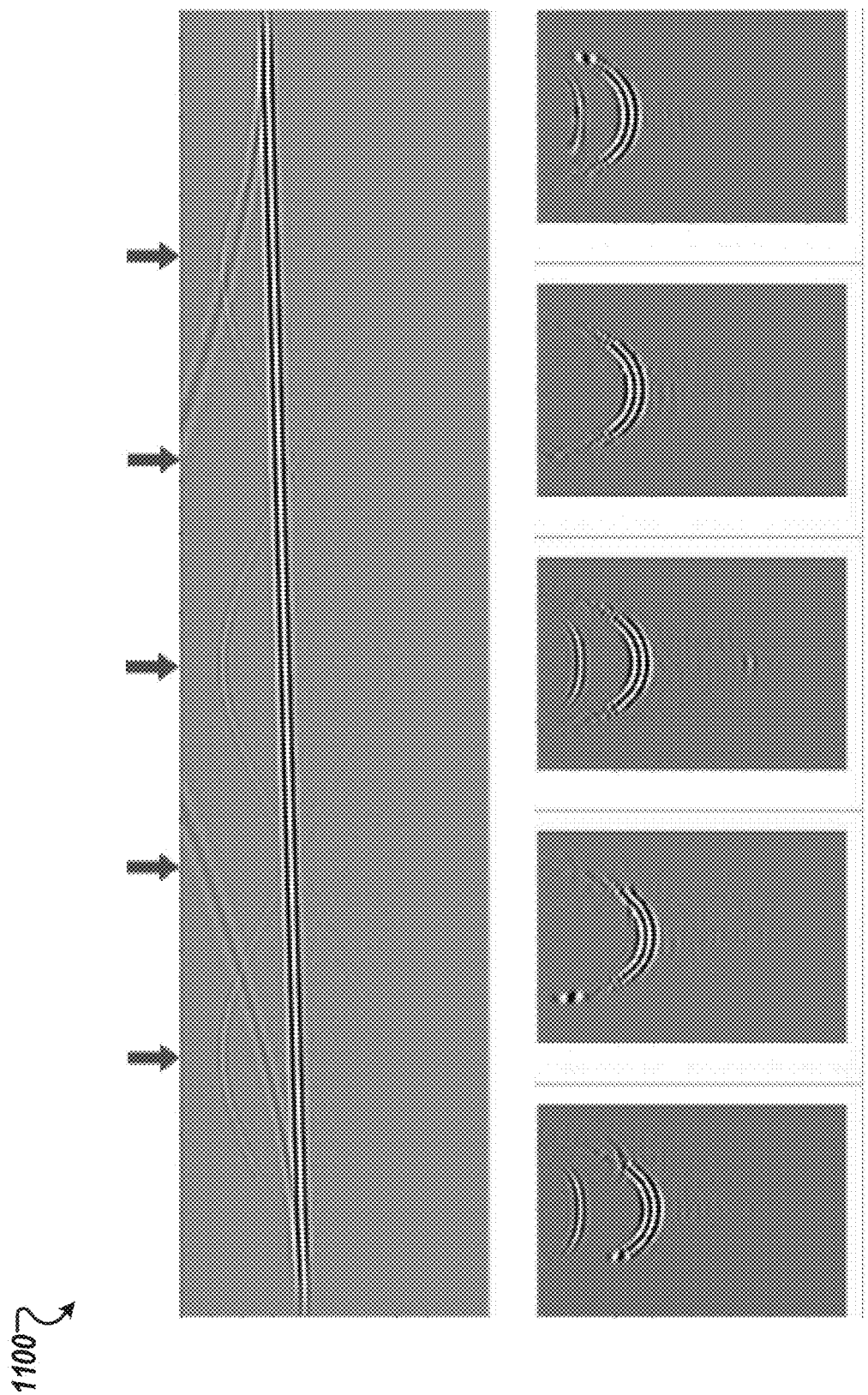

FIG. 10 illustrates example images 1000 on the dipping layer model using an exact velocity model (e.g., a correct velocity model). The stacked image is shown on the top of FIG. 10. Five scattering angle gathers (SAG) at locations identified by arrows in the stacked image are shown below the stacked image in FIG. 10. Similarly, FIG. 11 illustrates example images 1100 on the dipping layer model using a fast velocity model (e.g., a wrong velocity model). The stacked image is shown on the top of FIG. 11. Five scattering angle gathers (SAG) at locations identified by arrows in the stacked image are shown below the stacked image in FIG. 11. As illustrated in FIGS. 10-11, the SAG with the exact velocity model (FIG. 10) show flat events, while the SAG with the fast velocity model (FIG. 11) show curved events.

Figure 12:
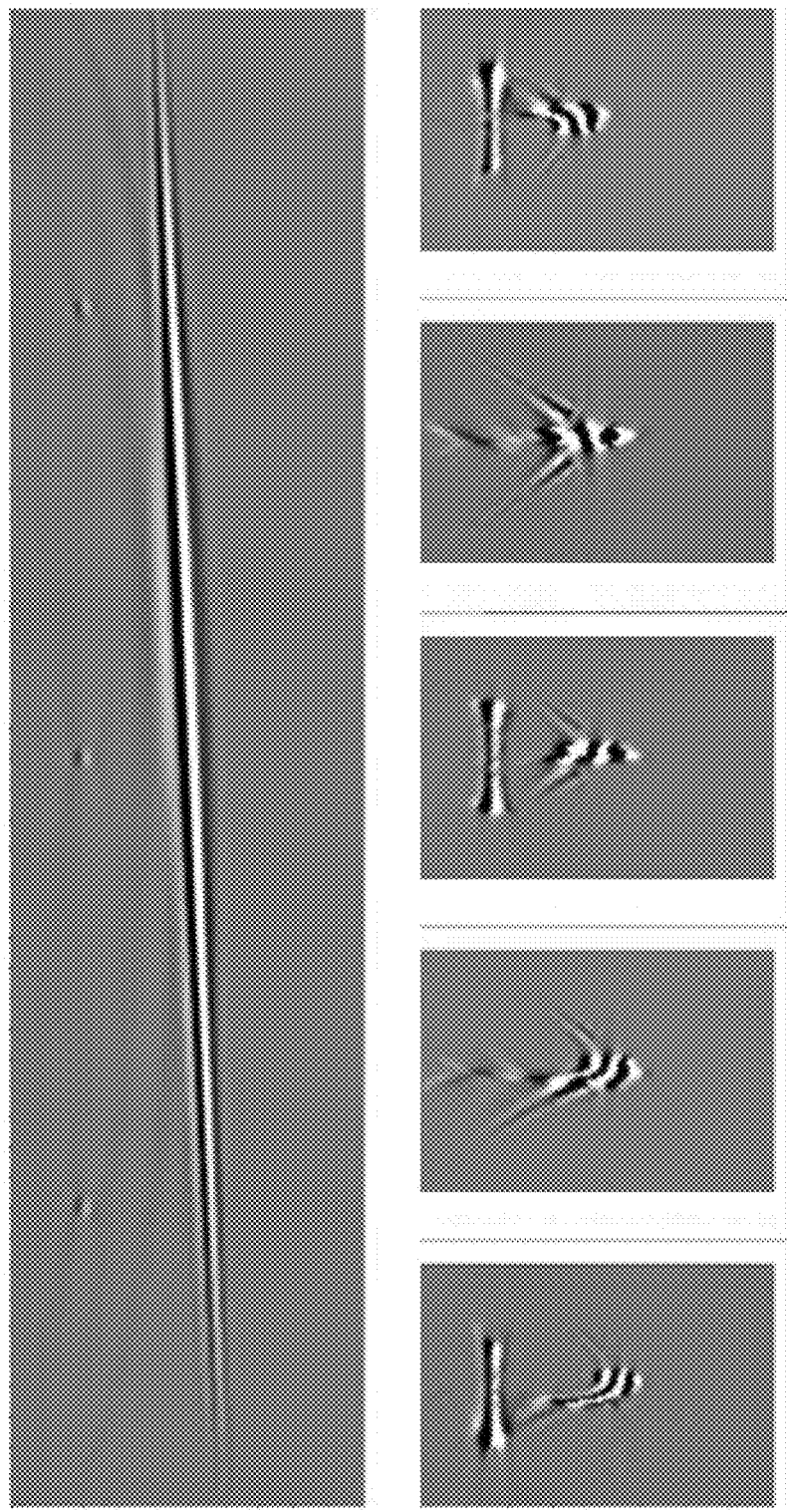
Figure 13:
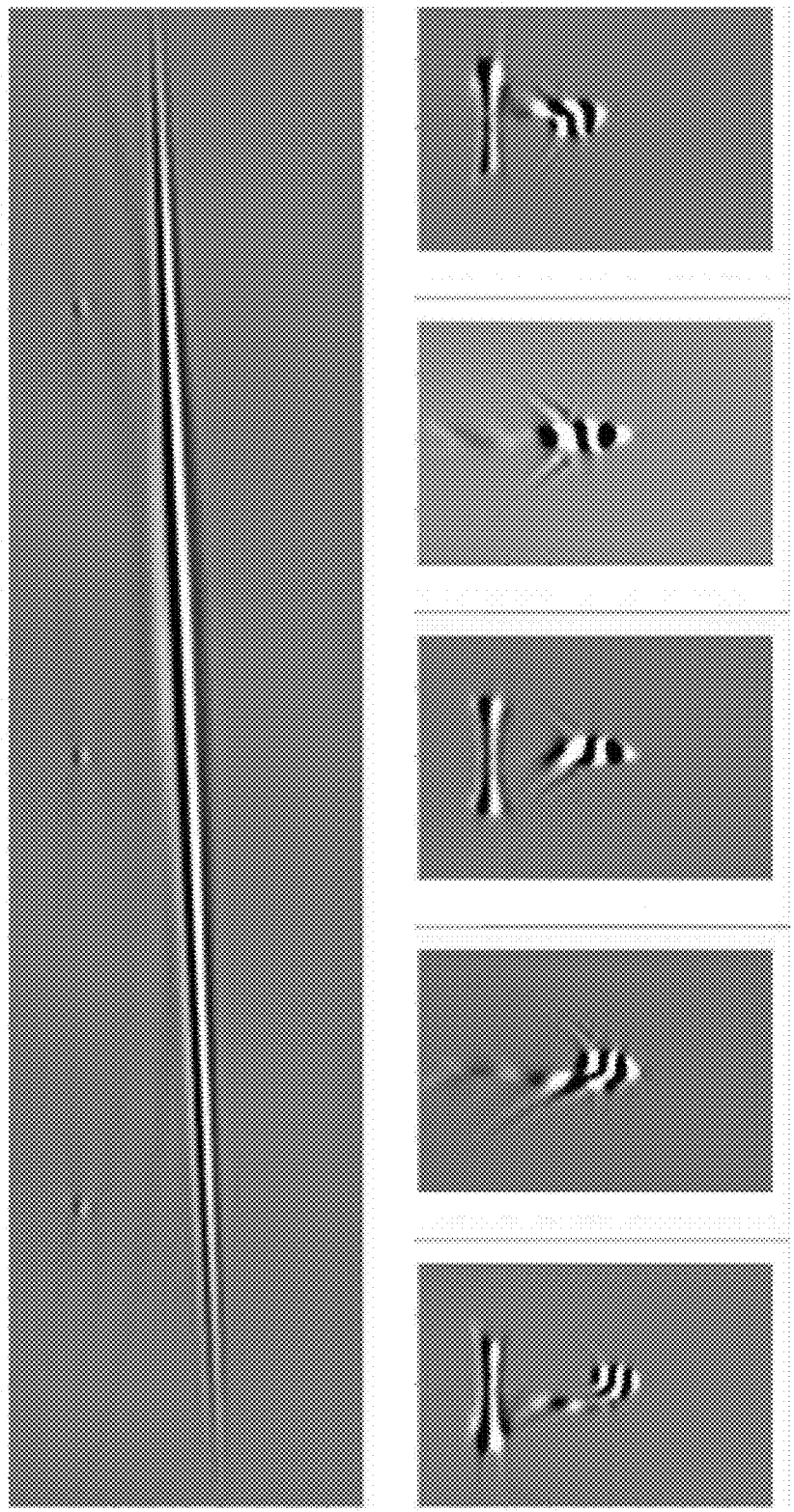

FIGS. 12-13 illustrate DAG, at the same locations of the SAG in FIGS. 10-11, using two different values of the smoothing parameter σ. FIG. 12 illustrates example images 1200 using the exact velocity model with a value of the smoothing parameter σ corresponding to a 2 degrees window. FIG. 13 illustrates example images 1300 using the exact velocity model with a value of the smoothing parameter σ corresponding to a 5 degrees window. As illustrated in FIGS. 12-13, the diffraction points are represented by flat lines, and the reflection points are represented by curved lines with a maximum amplitude at the dip location. In addition, using a larger smoothing parameter σ results in improved signal to noise ratio in the DAG domain.

Figure 14:
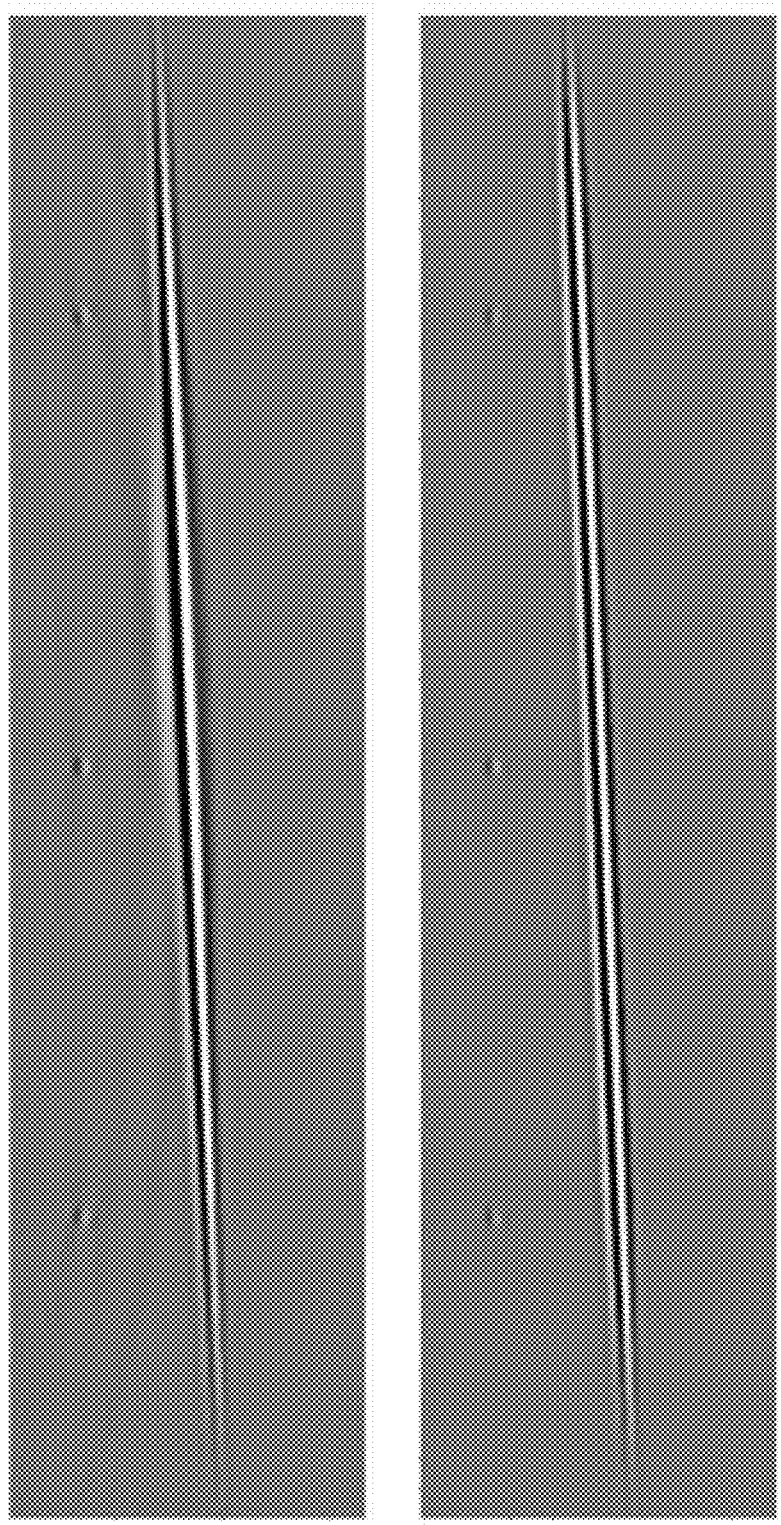

FIG. 14 illustrates example images 1400 with selective stack, according to some implementations. In FIG. 14, the stacked image (same as the stacked image in FIG. 10) is shown on the top. Selective stack can be performed to remove unwanted events in the stack image. For example, a selection in the SAG domain is performed to keep only the SAG between −40 degrees and +40 degrees. The final image after the selective stack is shown on the bottom of FIG. 14.

Figure 15:
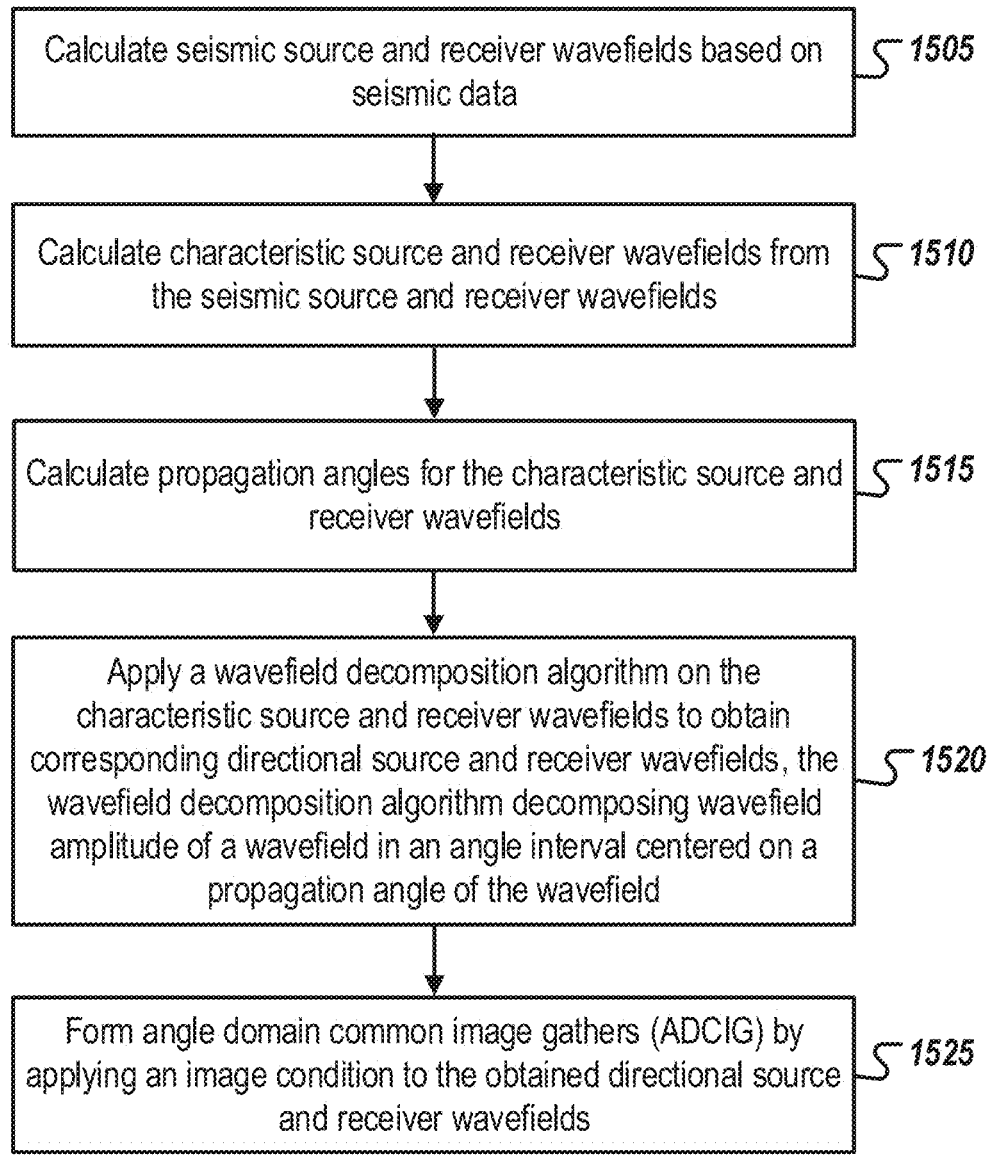
FIG. 15 is a flowchart illustrating an example method for modeling angle domain common image gathers (ADCIG) from reverse time migration (RTM), according to some implementations.

FIG. 15 is a flowchart of an example method 1500 for modeling angle domain common image gathers (ADCIG) from reverse time migration (RTM), according to some implementations. For clarity of presentation, the description that follows generally describes method 1500 in the context of the other figures in this description. For example, method 1500 can be performed by a computer system described in FIG. 16. However, it will be understood that method 1500 may be performed, for example, by any suitable system, environment, software, and hardware, or a combination of systems, environments, software, and hardware, as appropriate. In some implementations, various steps of method 1500 can be run in parallel, in combination, in loops, or in any order.

The method 1500 starts at block 1505 where seismic source and receiver wavefields are calculated based on seismic data. In some implementations, the seismic data is generated by sending seismic source waves, for example, from a seismic energy source such as an air gun, into earth subsurface layers and digitally sampling the seismic waves reflected by the earth subsurface layers. The seismic data captures reflected waves as a function of time. The seismic data can include amplitudes, phases, or both, of the reflected waves. In some implementations, the seismic source and receiver wavefields are calculated using a time-domain wave equation solver. In some implementations, the seismic source and receiver wavefields are calculated using a frequency-domain wave equation solver.

At block 1510, characteristic source and receiver wavefields are calculated from the seismic source and receiver wavefields (e.g., Equation (9)). In some implementations, the characteristic source and receiver wavefields are calculated for a plurality of predefined time steps with a first-order acoustic wave equation propagating model (e.g., Equation (1)). In some implementations, the characteristic source and receiver wavefields are calculated for a plurality of predefined time steps with a second-order acoustic wave equation propagating model.

At block 1515, propagation angles are calculated for both the characteristic source and receiver wavefields (e.g., Equation (13)). In some implementations, the characteristic source wavefield has an absolute amplitude, at the propagation angle for the characteristic source wavefield, larger than an absolute amplitude at any other angles different from the propagation angle for the characteristic source wavefield. The characteristic receiver wavefield has an absolute amplitude, at the propagation angle for the characteristic receiver wavefield, larger than an absolute amplitude at any other angles different from the propagation angle for the characteristic receiver wavefield. In some implementations, the propagation angles are calculated by applying trigonometric computations on the characteristic source and receiver wavefields (e.g., Equations (11) to (13)).

At block 1520, a wavefield decomposition algorithm is applied on the characteristic source and receiver wavefields to obtain corresponding directional source and receiver wavefields. The wavefield decomposition algorithm decomposes wavefield amplitude of a wavefield in an angle interval centered on a propagation angle of the wavefield (e.g., Equations (14) to (18)). In some implementations, the angle interval is defined by a windowing function, such as a Gaussian function. In some implementations, the angle interval can be 1 degree, 5 degrees, or 15 degrees. In some other implementations, the angle interval can be any other number of degrees.

At block 1525, angle domain common image gathers (ADCIG) are formed by applying an image condition to the obtained directional source and receiver wavefields. In some implementations, the ADCIG are formed using a reverse time migration (RTM) process. In some implementations, the image condition is a conventional cross-correlation imaging condition (e.g., used in Equation (19)). In some implementations, the formed ADCIG are scattering angle gathers (SAG) (e.g., Equation (20)). In some implementations, the formed ADCIG are dip angle gathers (DAG) (e.g., Equation (21)).

The example method 1500 shown in FIG. 15 can be modified or reconfigured to include additional, fewer, or different steps (not shown in FIG. 15), which can be performed in the order shown or in a different order. In some implementations, one or more of the steps shown in FIG. 15 can be repeated or iterated, for example, until a terminating condition is reached. In some implementations, one or more of the individual steps shown in FIG. 15 can be executed as multiple separate steps, or one or more subsets of the steps shown in FIG. 15 can be combined and executed as a single step. In some implementations, one or more of the individual steps shown in FIG. 15 may also be omitted from the example method 1500.

Figure 16:
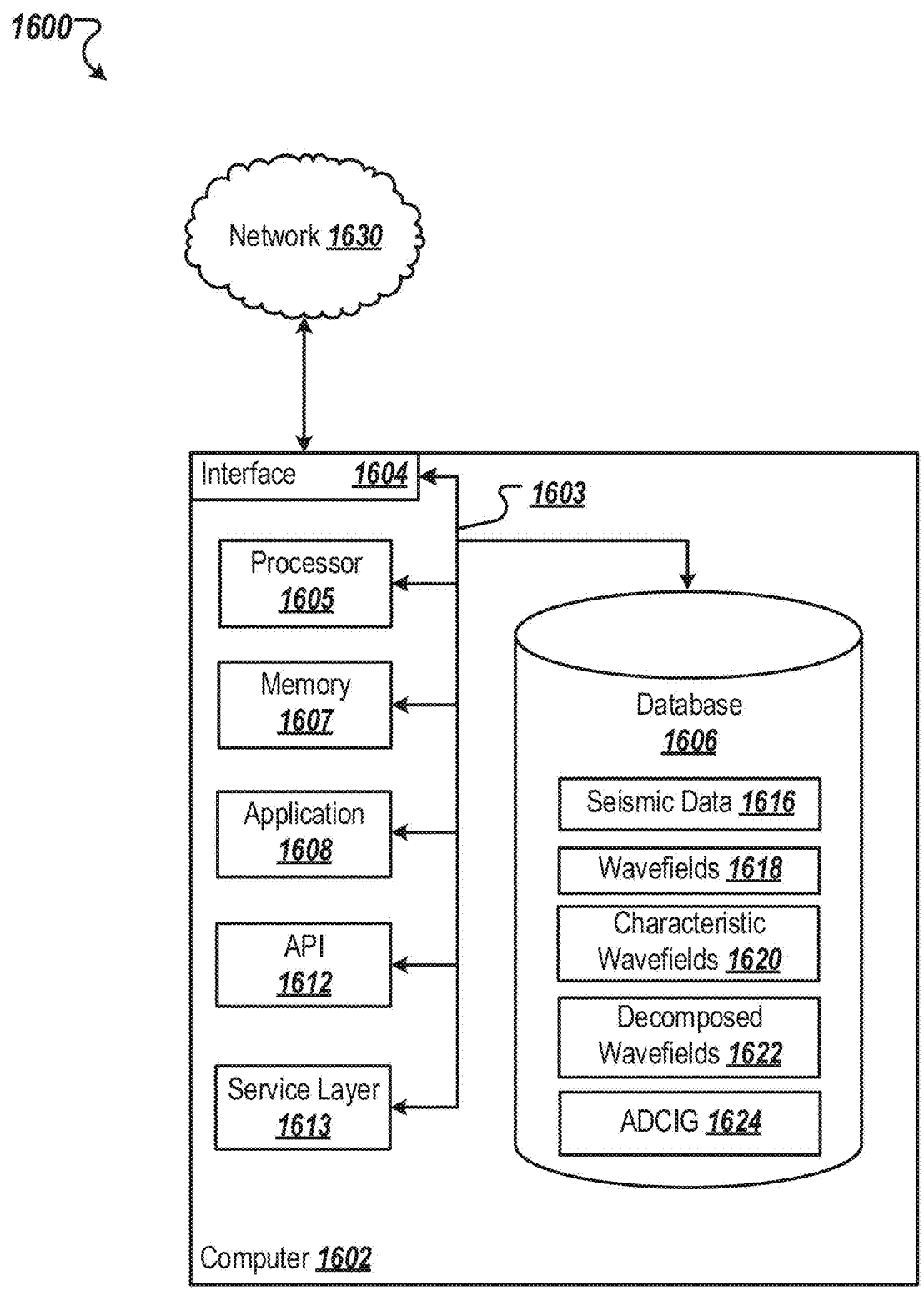
FIG. 16 is a block diagram illustrating an example computer system used to provide computational functionalities associated with described algorithms, methods, functions, processes, flows, and procedures as described in the instant disclosure, according to some implementations.

FIG. 16 is a block diagram of an example computer system 1600 used to provide computational functionalities associated with described algorithms, methods, functions, processes, flows, and procedures as described in the instant disclosure, according to an implementation. The illustrated computer 1602 is intended to encompass any computing device such as a server, desktop computer, laptop/notebook computer, wireless data port, smart phone, personal data assistant (PDA), tablet computing device, one or more processors within these devices, or any other suitable processing device, including physical or virtual instances (or both) of the computing device. Additionally, the computer 1602 may comprise a computer that includes an input device, such as a keypad, keyboard, touch screen, or other device that can accept user information, and an output device that conveys information associated with the operation of the computer 1602, including digital data, visual, or audio information (or a combination of information), or a graphical user interface (GUI).

The computer 1602 can serve in a role as a client, network component, a server, a database or other persistency, or any other component (or a combination of roles) of a computer system for performing the subject matter described in the instant disclosure. The illustrated computer 1602 is communicably coupled with a network 1630. In some implementations, one or more components of the computer 1602 may be configured to operate within environments, including cloud-computing-based, local, global, or other environment (or a combination of environments).

At a high level, the computer 1602 is an electronic computing device operable to receive, transmit, process, store, or manage data and information associated with the described subject matter. According to some implementations, the computer 1602 may also include or be communicably coupled with an application server, e-mail server, web server, caching server, streaming data server, or other server (or a combination of servers).

The computer 1602 can receive requests over network 1630 from a client application (for example, executing on another computer) and responding to the received requests by processing the received requests using the appropriate software application(s). In addition, requests may also be sent to the computer 1602 from internal users (for example, from a command console or by other appropriate access method), external or third-parties, other automated applications, as well as any other appropriate entities, individuals, systems, or computers.

Each of the components of the computer 1602 can communicate using a system bus 1603. In some implementations, any or all of the components of the computer 1602, both hardware or software (or a combination of hardware and software), may interface with each other or the interface 1604 (or a combination of both) over the system bus 1603 using an application programming interface (API) 1612 or a service layer 1613 (or a combination of the API 1612 and service layer 1613). The API 1612 may include specifications for routines, data structures, and object classes. The API 1612 may be either computer-language independent or dependent and refer to a complete interface, a single function, or even a set of APIs. The service layer 1613 provides software services to the computer 1602 or other components (whether or not illustrated) that are communicably coupled to the computer 1602. The functionality of the computer 1602 may be accessible for all service consumers using this service layer. Software services, such as those provided by the service layer 1613, provide reusable, defined functionalities through a defined interface. For example, the interface may be software written in JAVA, C++, or other suitable language providing data in extensible markup language (XML) format or other suitable format. While illustrated as an integrated component of the computer 1602, alternative implementations may illustrate the API 1612 or the service layer 1613 as stand-alone components in relation to other components of the computer 1602 or other components (whether or not illustrated) that are communicably coupled to the computer 1602. Moreover, any or all parts of the API 1612 or the service layer 1613 may be implemented as child or sub-modules of another software module, enterprise application, or hardware module without departing from the scope of this disclosure.

The computer 1602 includes an interface 1604. Although illustrated as a single interface 1604 in FIG. 16, two or more interfaces 1604 may be used according to particular needs, desires, or particular implementations of the computer 1602. The interface 1604 is used by the computer 1602 for communicating with other systems that are connected to the network 1630 (whether illustrated or not) in a distributed environment. Generally, the interface 1604 comprises logic encoded in software or hardware (or a combination of software and hardware) and is operable to communicate with the network 1630. More specifically, the interface 1604 may comprise software supporting one or more communication protocols associated with communications such that the network 1630 or interface's hardware is operable to communicate physical signals within and outside of the illustrated computer 1602.

The computer 1602 includes a processor 1605. Although illustrated as a single processor 1605 in FIG. 16, two or more processors may be used according to particular needs, desires, or particular implementations of the computer 1602. Generally, the processor 1605 executes instructions and manipulates data to perform the operations of the computer 1602 and any algorithms, methods, functions, processes, flows, and procedures as described in the instant disclosure.

The computer 1602 also includes a database 1606 that can hold data for the computer 1602 or other components (or a combination of both) that can be connected to the network 1630 (whether illustrated or not). For example, database 1606 can be an in-memory, conventional, or other type of database storing data consistent with this disclosure. In some implementations, database 1606 can be a combination of two or more different database types (for example, a hybrid in-memory and conventional database) according to particular needs, desires, or particular implementations of the computer 1602 and the described functionality. Although illustrated as a single database 1606 in FIG. 16, two or more databases (of the same or combination of types) can be used according to particular needs, desires, or particular implementations of the computer 1602 and the described functionality. While database 1606 is illustrated as an integral component of the computer 1602, in alternative implementations, database 1606 can be external to the computer 1602. As illustrated, the database 1606 holds seismic data 1616, source and receiver wavefields 1618, characteristic source and receiver wavefields 1620, decomposed source and receiver wavefields 1622, and the angle domain common image gathers (ADCIG) 1624.

The computer 1602 also includes a memory 1607 that can hold data for the computer 1602 or other components (or a combination of both) that can be connected to the network 1630 (whether illustrated or not). For example, memory 1607 can be random access memory (RAM), read-only memory (ROM), optical, magnetic, and the like storing data consistent with this disclosure. In some implementations, memory 1607 can be a combination of two or more different types of memory (for example, a combination of RAM and magnetic storage) according to particular needs, desires, or particular implementations of the computer 1602 and the described functionality. Although illustrated as a single memory 1607 in FIG. 16, two or more memories 1607 (of the same or combination of types) can be used according to particular needs, desires, or particular implementations of the computer 1602 and the described functionality. While memory 1607 is illustrated as an integral component of the computer 1602, in alternative implementations, memory 1607 can be external to the computer 1602.

The application 1608 is an algorithmic software engine providing functionality according to particular needs, desires, or particular implementations of the computer 1602, particularly with respect to functionality described in this disclosure. For example, application 1608 can serve as one or more components, modules, or applications. Further, although illustrated as a single application 1608, the application 1608 may be implemented as multiple applications 1608 on the computer 1602. In addition, although illustrated as integral to the computer 1602, in alternative implementations, the application 1608 can be external to the computer 1602.

There may be any number of computers 1602 associated with, or external to, a computer system containing computer 1602, each computer 1602 communicating over network 1630. Further, the term "client," "user," and other appropriate terminology may be used interchangeably as appropriate without departing from the scope of this disclosure. Moreover, this disclosure contemplates that many users may use one computer 1602, or that one user may use multiple computers 1602.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or be described as a program, software, a software application, a module, a software module, a script, or code can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM), or both. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20, or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously-described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously-described implementations should not be understood as requiring such separation or integration in all implementations, and it should be understood that the described program components and systems can generally be integrated together in a single software product or packaged into multiple software products.

Accordingly, the previously-described example implementations do not define or constrain this disclosure. Other changes, substitutions, and alterations are also possible without departing from the spirit and scope of this disclosure.

Furthermore, any claimed implementation is considered to be applicable to at least a computer-implemented method;

a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

REFERENCES

Yoon, K. and K. J. Marfurt, 2006, Reverse-time migration using the Poynting vector: Exploration Geophysics, 37, 102-107, doi: 10.1071/EG06102.

Patrikeeva, N. and P. C. Sava, 2013, Comparison of angle decomposition methods for wave-equation migration: $83^{rd}$ Annual International Meeting, SEG, Expanded Abstracts, 3773-3778.

L. Metivier, R. Brossier, S. Labbé, S Operto, and J. Virieux, 2014, A robust absorbing layer method for anisotropic seismic wave modeling: Journal of Computational Physics, 279, 218-240.

The invention claimed is:

1. A method comprising:
calculating seismic source and receiver wavefields based on seismic data;
calculating characteristic source and receiver wavefields from the seismic source and receiver wavefields using characteristic solutions of a first order wave equation;
calculating propagation angles for the characteristic source and receiver wavefields;
applying a wavefield decomposition algorithm on the characteristic source and receiver wavefields to obtain corresponding directional source and receiver wavefields, wherein the wavefield decomposition algorithm decomposes wavefield amplitude of a wavefield in an angle interval centered on a propagation angle of the wavefield; and
forming angle domain common image gathers (ADCIG) by applying an image condition to the obtained directional source and receiver wavefields.

2. The method of claim 1, wherein the seismic source and receiver wavefields are calculated using a time-domain wave equation solver.

3. The method of claim 1, wherein the seismic source and receiver wavefields are calculated using a frequency-domain wave equation solver.

4. The method of claim 1, wherein the ADCIG are formed using a reverse time migration (RTM) process.

5. The method of claim 1, wherein the characteristic source and receiver wavefields are calculated for a plurality of predefined time steps with a first-order acoustic wave equation propagating model.

6. The method of claim 1, wherein the characteristic source and receiver wavefields are calculated for a plurality of predefined time steps with a second-order acoustic wave equation propagating model.

7. The method of claim 1, wherein the characteristic source wavefield has an absolute amplitude, at the propagation angle for the characteristic source wavefield, larger than an absolute amplitude at any other angles, and wherein the characteristic receiver wavefield has an absolute amplitude, at the propagation angle for the characteristic receiver wavefield, larger than an absolute amplitude at any other angles.

8. The method of claim 1, wherein the angle interval is 1 degree, 5 degrees, or 15 degrees.

9. The method of claim 1, wherein the image condition is a cross-correlation imaging condition.

10. The method of claim 1, wherein the ADCIG are scattering angle gathers (SAG).

11. The method of claim 1, wherein the ADCIG are dip angle gathers (DAG).

12. A device, comprising:
a memory; and
a processing unit that is arranged to perform operations including:
calculating seismic source and receiver wavefields based on seismic data;
calculating characteristic source and receiver wavefields from the seismic source and receiver wavefields using characteristic solutions of a first order wave equation;
calculating propagation angles for the characteristic source and receiver wavefields;
applying a wavefield decomposition algorithm on the characteristic source and receiver wavefields to obtain corresponding directional source and receiver wavefields, wherein the wavefield decomposition algorithm decomposes wavefield amplitude of a wavefield in an angle interval centered on a propagation angle of the wavefield; and
forming angle domain common image gathers (ADCIG) by applying an image condition to the obtained directional source and receiver wavefields.

13. The device of claim 12, wherein the seismic source and receiver wavefields are calculated using a time-domain wave equation solver.

14. The device of claim 12, wherein the seismic source and receiver wavefields are calculated using a frequency-domain wave equation solver.

15. The device of claim 12, wherein the ADCIG are formed using a reverse time migration (RTM) process.

16. The device of claim 12, wherein the characteristic source and receiver wavefields are calculated for a plurality of predefined time steps with a first-order acoustic wave equation propagating model.

17. The device of claim 12, wherein the characteristic source and receiver wavefields are calculated for a plurality of predefined time steps with a second-order acoustic wave equation propagating model.

18. The device of claim 12, wherein the characteristic source wavefield has an absolute amplitude, at the propagation angle for the characteristic source wavefield, larger than an absolute amplitude at any other angles, and wherein the characteristic receiver wavefield has an absolute amplitude, at the propagation angle for the characteristic receiver wavefield, larger than an absolute amplitude at any other angles.

19. The device of claim 12, wherein the angle interval is 1 degree, 5 degrees, or 15 degrees.

20. A non-transitory computer-readable medium storing instructions executable by a computer system to perform operations comprising:
calculating seismic source and receiver wavefields based on seismic data;
calculating characteristic source and receiver wavefields from the seismic source and receiver wavefields using characteristic solutions of a first order wave equation;
calculating propagation angles for the characteristic source and receiver wavefields;
applying a wavefield decomposition algorithm on the characteristic source and receiver wavefields to obtain corresponding directional source and receiver wavefields, wherein the wavefield decomposition algorithm decomposes wavefield amplitude of a wavefield in an angle interval centered on a propagation angle of the wavefield; and forming angle domain common image gathers (AD-CIG) by applying an image condition to the obtained directional source and receiver wavefields.

\* \* \* \* \*